(12) United States Patent
Miyazaki

(10) Patent No.: US 12,267,608 B2
(45) Date of Patent: Apr. 1, 2025

(54) SOLID-STATE IMAGING DEVICE AND ELECTRONIC DEVICE

(71) Applicant: Sony Semiconductor Solutions Corporation, Kanagawa (JP)

(72) Inventor: Takahiro Miyazaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 50 days.

(21) Appl. No.: 18/033,493

(22) PCT Filed: Oct. 18, 2021

(86) PCT No.: PCT/JP2021/038359
§ 371 (c)(1),
(2) Date: Apr. 24, 2023

(87) PCT Pub. No.: WO2022/091826
PCT Pub. Date: May 5, 2022

(65) Prior Publication Data
US 2023/0403482 A1   Dec. 14, 2023

(30) Foreign Application Priority Data
Oct. 30, 2020   (JP) .................................. 2020-182095

(51) Int. Cl.
*H04N 25/77*   (2023.01)
(52) U.S. Cl.
CPC .................................. *H04N 25/77* (2023.01)
(58) Field of Classification Search
CPC ........ H04N 25/77; H04N 25/47; H04N 25/40; H04N 25/703; H04N 25/707
See application file for complete search history.

(56) References Cited

U.S. PATENT DOCUMENTS

2012/0257789 A1* 10/2012 Lee .................. G06F 3/017
382/103
2018/0262665 A1   9/2018 Jung
(Continued)

FOREIGN PATENT DOCUMENTS

EP   3506622 A1   7/2019
JP   2003116006 A   4/2003
(Continued)

OTHER PUBLICATIONS

International Search Report (PCT/ISA/210), International Application No. PCT/JP2021/038359, dated Dec. 21, 2021.
(Continued)

*Primary Examiner* — Yogesh K Aggarwal
(74) *Attorney, Agent, or Firm* — Michael Best & Friedrich LLP

(57) ABSTRACT

A decrease in event detection efficiency is suppressed. A solid-state imaging device according to an embodiment includes a pixel array unit (101) in which a plurality of pixels each detecting a change in luminance of incident light is disposed in a two-dimensional lattice pattern, a signal processing unit (103) that generates first event data including position information about one or more pixels that detect a change in luminance, an adjustment unit (320) that adjusts an amount of data of the first event data to generate second event data, and an output unit (109) that outputs the second event data to an outside, wherein the adjustment unit includes a plurality of paths that adjusts the amount of data of the first event data by respective different methods to generate the second event data, and wherein the output unit outputs at least one of the second event data output from the plurality of respective paths to the outside.

15 Claims, 25 Drawing Sheets

(56) References Cited

U.S. PATENT DOCUMENTS

| | | |
|---|---|---|
| 2019/0007678 A1 | 1/2019 | Perez-Ramirez |
| 2019/0204121 A1 | 7/2019 | Yen |
| 2019/0279100 A1* | 9/2019 | Cline .................... G06F 18/214 |
| 2019/0364230 A1 | 11/2019 | Yeo |
| 2020/0092508 A1 | 3/2020 | Park |
| 2020/0366824 A1* | 11/2020 | Hofer .................... H04N 23/689 |
| 2021/0152757 A1 | 5/2021 | Wakabayashi |
| 2023/0234503 A1 | 7/2023 | Ryoji |

FOREIGN PATENT DOCUMENTS

| | | |
|---|---|---|
| JP | 2004248320 A | 9/2004 |
| JP | 2017535999 A | 11/2017 |
| JP | 2020127186 A | 8/2020 |
| WO | WO-2020027233 A1 | 2/2020 |
| WO | WO-2020116185 A1 | 6/2020 |

OTHER PUBLICATIONS

Chen et al, "A low-complexity image compression algorithm for Address-Event Representation (AER) PWM image sensors", Circuits and Systems (ISCAS), 2011 IEEE International Symposium on, IEEE, May 15, 2011, pp. 2825-2828.

Khan et al, "Time-Aggregation-Based Lossless Video Encoding for Neuromorphic Vision Sensor Data", IEEE Internet of Things Journal, IEEE, USA, vol. 8, No. 1, Jul. 8, 2020, pp. 596-609.

* cited by examiner

FIG.5

| | NO CODING | CODING (CODING WITH X COORDINATE) | COM-PRES-SION RATIO |
|---|---|---|---|
| WHEN THERE ARE SMALL NUMBER OF EVENTS (FOR EXAMPLE, ONE PIXEL) | (a) DATA FOR ONE LINE(ex.1000pix) AMOUNT OF DATA D=2bit × 1000pix=2000bit | (c) DATA FOR ONE LINE(ex.1000pix) AMOUNT OF DATA D=(9+1) × 1bit=10bit (x COORDINATE:9bits, POLARITY:1bit) | 0.5% |
| WHEN THERE ARE LARGE NUMBER OF EVENTS (FOR EXAMPLE, ALL PIXELS) | (b) DATA FOR ONE LINE(ex.1000pix) AMOUNT OF DATA D=2bit × 1000pix=2000bit | (d) DATA FOR ONE LINE(ex.1000pix) AMOUNT OF DATA D=(9+1) × 1000pix=1000bit (x COORDINATE:9bit, POLARITY:1bit) | 500% |

 : EVENT DETECTION PIXEL
 : EVENT NON-DETECTION PIXEL

OUTPUT DATA

| y | $x_0, p_0$ | $x_1, p_1$ | $x_2, p_2$ | $x_3, p_3$ | = (y),(1,1),(0,10),(2,3),(0,2)

FIG.22

INPUT DATA

OUTPUT DATA

'11' '0' '0' '0' '0' '0' '0' '0' '0' '0' '0' '10' '10' '10' '0' '0'

SOLID-STATE IMAGING DEVICE AND ELECTRONIC DEVICE

FIELD

The present disclosure relates to a solid-state imaging device and an electronic device.

BACKGROUND

In a solid-state imaging device including a complementary metal oxide semiconductor (CMOS) or the like, an asynchronous solid-state imaging element that detects a change in luminance for each pixel in real time as an event has been proposed (for example, Patent Literature 1). As described above, the solid-state imaging element that detects an event for each pixel is also referred to as an event-based vision sensor (EVS) or a dynamic vision sensor (DVS).

CITATION LIST

Patent Literature

Patent Literature 1: JP 2017-535999 W

SUMMARY

Technical Problem

In the EVS, detection of an event for each pixel is output to the outside as event data in a predetermined format. In a case where many events are detected at a time, for example, event data of an amount of data exceeding a transmission band may occur. As described above, in a case where the amount of data exceeding the transmission band occurs, there is a problem that it is necessary to discard the event data that cannot be transmitted, and the detection efficiency of the event is lowered.

Therefore, the present disclosure proposes a solid-state imaging device and an electronic device capable of suppressing a decrease in event detection efficiency.

Solution to Problem

To solve the problems described above, a solid-state imaging device according to an embodiment of the present disclosure includes: a pixel array unit in which a plurality of pixels each detecting a change in luminance of incident light is disposed in a two-dimensional lattice pattern; a signal processing unit that generates first event data including position information about one or more pixels that detect a change in luminance; an adjustment unit that adjusts an amount of data of the first event data to generate second event data; and an output unit that outputs the second event data to an outside, wherein the adjustment unit includes a plurality of paths that adjusts the amount of data of the first event data by respective different methods to generate the second event data, and wherein the output unit outputs at least one of the second event data output from the plurality of respective paths to the outside.

BRIEF DESCRIPTION OF DRAWINGS

FIG. 5 is a diagram for explaining a case where an amount of data increases due to coding.

FIG. 8 is a diagram illustrating event data according to a first example of the first embodiment.

FIG. 9 is a diagram illustrating event data according to a second example of the first embodiment.

FIG. 10 is a diagram illustrating event data according to a third example of the first embodiment.

FIG. 11 is a diagram illustrating event data according to a fourth example of the first embodiment.

FIG. 22 is a diagram for describing coding of event data for one line using the fourth coding scheme (Light Huffman coding) according to the first embodiment (part 2).

FIG. 23 is a diagram for describing coding of event data for one line using the fourth coding scheme (Light Huffman coding) according to the first embodiment (part 3).

DESCRIPTION OF EMBODIMENTS

Figure 1:
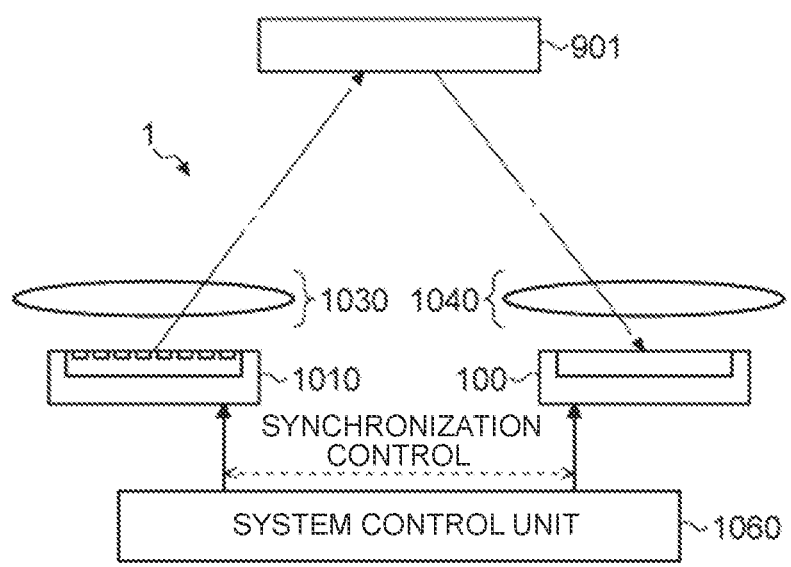
FIG. 1 is a schematic diagram illustrating a schematic configuration example of an electronic device equipped with a solid-state imaging device according to the first embodiment.

Hereinafter, the embodiments of the present disclosure will be described in detail with reference to the drawings. In the following embodiments, the same parts are designated by the same reference numerals, so that duplicate description will be omitted.

Further, the present disclosure will be described in the order of the following items.

1. First Embodiment
1.1 System configuration example
1.2 Schematic configuration example of EVS device
1.3 Example of circuit configuration of unit pixel
1.4 Data transmission
1.5 Schematic configuration example of event signal processing circuit
1.6 Example of event data
1.7 Example of coding scheme
1.7.1 First coding scheme
1.7.2 Second coding scheme
1.7.3 Third coding scheme
1.7.4 Fourth coding scheme
1.7.5 Fifth coding scheme
1.8 Example of signal process
1.8.1 First signal process
1.8.2 Second signal process
1.8.3 Third signal process
1.9 Output example of frame data
1.9.1 First output example
1.9.2 Second output example
1.9.3 Third output example
1.9.4 Fourth output example
1.9.5 Fifth output example
1.10 Summary
2. Second Embodiment
2.1 Schematic configuration example of event signal processing circuit
2.2 Summary
2.3 Modification
3. Hardware Configuration 1. First Embodiment First, the first embodiment will be described in detail with reference to the drawings.

1.1 System Configuration Example

Figure 2:
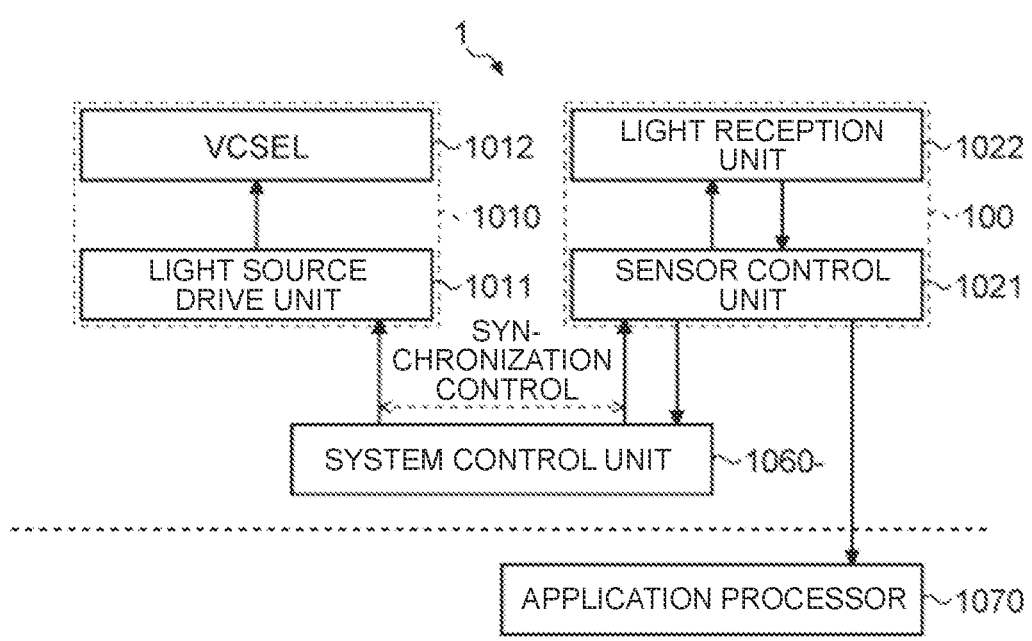
FIG. 2 is a block diagram illustrating a system configuration example of the electronic device according to the first embodiment.

FIG. 1 is a schematic diagram illustrating a schematic configuration example of an electronic device equipped with a solid-state imaging device according to the first embodiment, and FIG. 2 is a block diagram illustrating a system configuration example of the electronic device according to the first embodiment.

As illustrated in FIG. 1, an electronic device 1 according to the present embodiment includes a laser light source 1010, an irradiation lens 1030, an imaging lens 1040, an EVS device 100 as a solid-state imaging device, and a system control unit 1060.

As illustrated in FIG. 2, the laser light source 1010 includes, for example, a vertical cavity surface emitting laser (VCSEL) 1012 and a light source drive unit 1011 that drives the VCSEL 1012. However, the present invention is not limited to the VCSEL 1012, and various light sources such as a light emitting diode (LED) may be used. Furthermore, the laser light source 1010 may be any of a point light source, a face light source, and a line light source. In the case of a face light source or a line light source, the laser light source 1010 may have, for example, a configuration in which a plurality of point light sources (for example, VCSELs) is disposed one-dimensionally or two-dimensionally. In the present embodiment, the laser light source 1010 may emit light of a wavelength band different from the wavelength band of visible light, such as infrared (IR) light, for example.

Irradiation lens 1030 is disposed on an emission surface side of laser light source 1010, and converts light emitted from laser light source 1010 into irradiation light having a predetermined divergence angle.

The imaging lens 1040 is disposed on the light receiving face side of the EVS device 100 and forms an image by incident light on the light receiving face of the EVS device 100. The incident light can also include reflected light emitted from laser light source 1010 and reflected by a subject 901.

Figure 3:
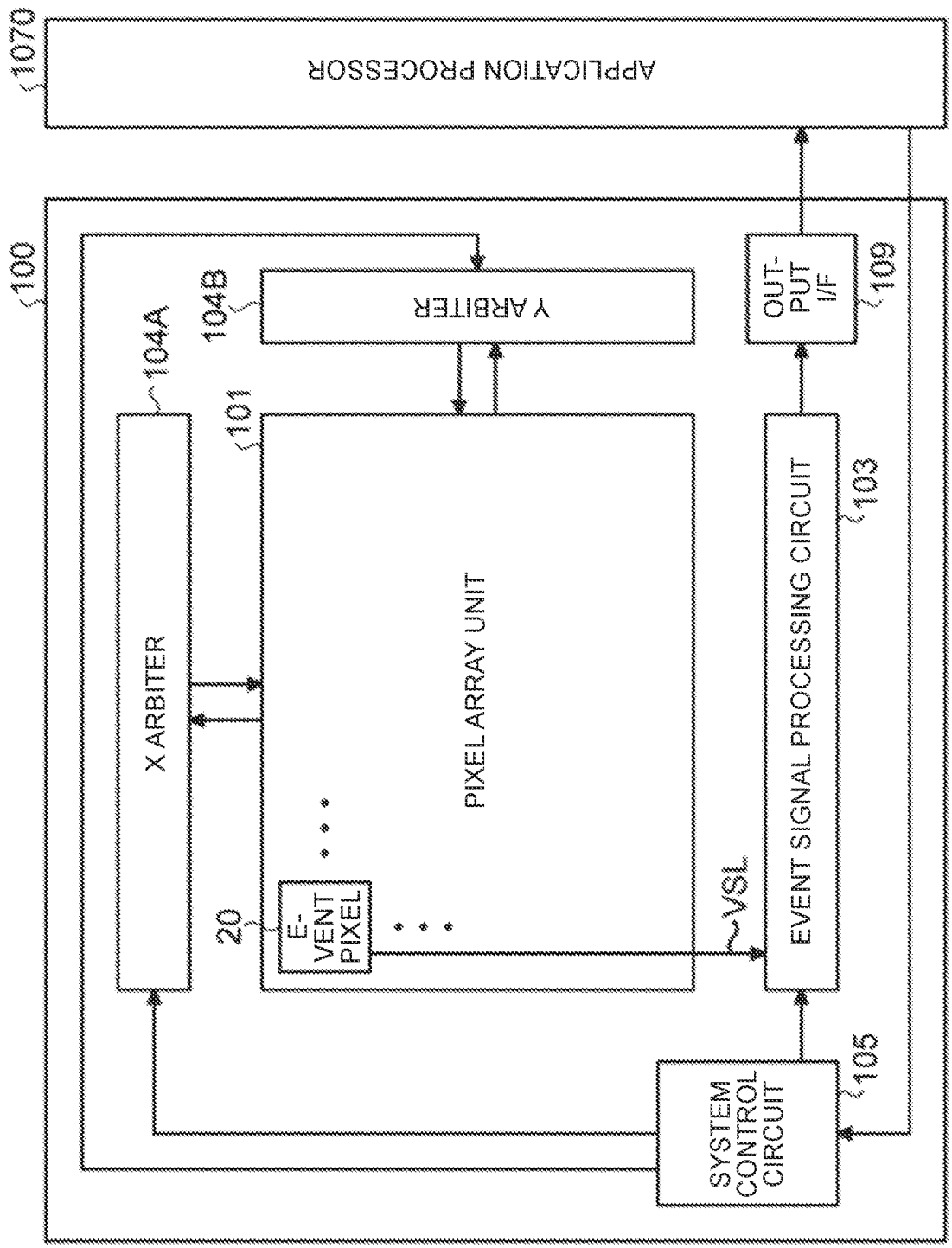
FIG. 3 is a block diagram illustrating a schematic configuration example of an EVS device according to the first embodiment.

As will be described in detail later, the EVS device 100 includes, for example, a light reception unit 1022 in which pixels (hereinafter, referred to as event pixels) for detecting an event are disposed in a two-dimensional lattice pattern, and a sensor control unit 1021 that generates frame data based on event data detected by the event pixels by driving the light reception unit 1022, as illustrated in FIG. 3.

The system control unit 1060 includes, for example, a processor (CPU), and drives the VCSEL 1012 via the light source drive unit 1011. In addition, the system control unit 1060 controls the EVS device 100 in synchronization with the control of the laser light source 1010, thereby acquiring event data detected according to the light emission/extinction of the laser light source 1010.

For example, the irradiation light emitted from the laser light source 1010 is projected onto a subject (also referred to as an object to be measured or an object) 901 through the irradiation lens 1030. The projected light is reflected by the subject 901. The light reflected by the subject 901 then passes through the imaging lens 1040 and enters the EVS device 100. The EVS device 100 receives the reflected light reflected by the subject 901 to generate event data, and generates frame data that is one image based on the generated event data. The frame data generated by the EVS device 100 is supplied to an application processor 1070 of the electronic device 1. The application processor 1070 as an information processing device executes a predetermined process such as an image process and a recognition process on the frame data input from the EVS device 100.

1.2 Schematic Configuration Example of EVS Device

Next, a schematic configuration example of the EVS device 100 will be described. FIG. 3 is a block diagram illustrating a schematic configuration example of an EVS device according to the present embodiment. As illustrated in FIG. 3, the EVS device 100 includes a pixel array unit 101, an X arbiter 104A and a Y arbiter 104B, an event signal processing circuit 103, a system control circuit 105, and an output interface (I/F) 109.

The pixel array unit 101 has a configuration in which a plurality of event pixels 20 each of which detects an event based on a change in luminance of incident light is disposed in a two-dimensional lattice pattern. Note that, in the following description, a row direction (also referred to as a row direction) refers to an array direction of pixels in a pixel row (lateral direction in the figure), and a column direction (also referred to as a column direction) refers to an array direction of pixels in a pixel column (longitudinal direction in drawings).

Each event pixel 20 includes a photoelectric conversion element that generates a charge according to the luminance of the incident light. In a case where a change in luminance of the incident light is detected based on the photocurrent flowing out from the photoelectric conversion element, the event pixel outputs a request for requesting reading from the pixel to the X arbiter 104A and the Y arbiter 104B to output an event signal indicating that an event has been detected according to arbitration by the X arbiter 104A and the Y arbiter 104B.

Each event pixel 20 detects the presence or absence of an event based on whether a change exceeding a predetermined threshold value has occurred in the photocurrent according to the luminance of the incident light. For example, each event pixel 20 detects that the change in luminance exceeds a predetermined threshold value (positive event) or falls below the predetermined threshold value (negative event) as an event.

When detecting an event, the event pixel 20 outputs a request for requesting permission to output an event signal indicating the occurrence of the event to each of the X arbiter 104A and the Y arbiter 104B. Then, the event pixel 20 outputs an event signal to the event signal processing circuit 103 when receiving a response indicating permission to output an event signal from each of the X arbiter 104A and the Y arbiter 104B.

The X arbiter 104A and the Y arbiter 104B arbitrate the request for requesting the output of the event signal supplied from each of the plurality of event pixels 20, to transmit a response based on the arbitration result (permission/non-permission of the output of the event signal) and a reset signal for resetting the event detection to the event pixel 20 that has output the request.

The event signal processing circuit 103 generates and output event data by executing the predetermined signal process on the event signal input from the event pixel 20.

As described above, the change in the photocurrent generated in the event pixel 20 can also be regarded as a change in light amount (change in luminance) of the light incident on the photoelectric conversion unit of the event pixel 20. Therefore, it can also be said that the event is a change in light amount (change in luminance) of the event pixel 20 exceeding the predetermined threshold value. The event data indicating the occurrence of the event includes at least position information such as coordinates indicating the position of the event pixel 20 where the change in light amount as the event has occurred. The event data can include the polarity of the change in light amount in addition to the position information.

For a series of event data output at the timing when an event occurs from the event pixel 20, as long as the interval between the pieces of event data is maintained at the time when the event occurs, it can be said that the event data implicitly includes time information indicating a relative time when the event occurs.

However, when the interval between the pieces of event data is not maintained as it is at the time of occurrence of the event when the event data is stored in the memory or the like, the time information implicitly included in the event data is lost. Therefore, before the interval between the pieces of event data is not maintained as it is at the time of occurrence of the event, the event signal processing circuit 103 may include time information, such as a time stamp or the like, indicating a relative time at which the event has occurred in the event data.

(Other Configurations)

The system control circuit 105 includes a timing generator that generates various timing signals, and the like, and performs drive control of the X arbiter 104A, the Y arbiter 104B, the event signal processing circuit 103, and the like based on various timings generated by the timing generator.

The output I/F 109 sequentially outputs the event data output row by row from the event signal processing circuit 103 to a processing device 200.

1.3 Example of Circuit Configuration of Unit Pixel

Figure 4:
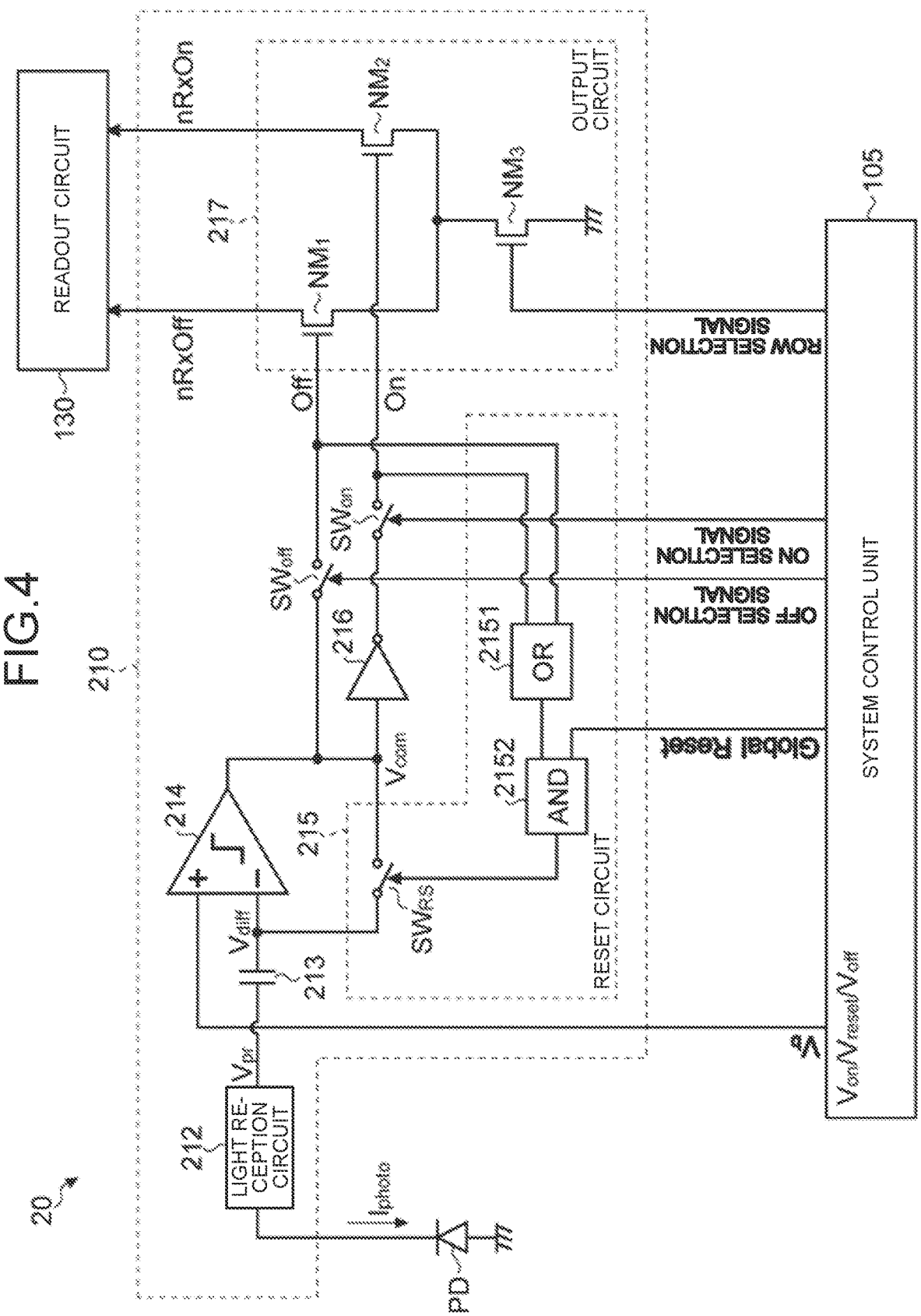
FIG. 4 is a circuit diagram illustrating a schematic configuration example of an event pixel according to the first embodiment.

Next, a circuit configuration example of the event pixel 20 will be described. FIG. 4 is a circuit diagram illustrating a schematic configuration example of an event pixel according to the first embodiment. Note that FIG. 4 illustrates a configuration example in a case where one comparator performs detection of a positive event and detection of a negative event in a time division manner.

Here, the event can include, for example, a positive event indicating that the change amount of the photocurrent exceeds the upper limit threshold value and a negative event indicating that the change amount falls below the lower limit threshold value. In this case, the event data indicating the occurrence of the event may include, for example, one bit indicating the occurrence of the event and one bit indicating the polarity of the occurred event. Note that the event pixel 20 can have a function of detecting only a positive event or a function of detecting only a negative event.

As illustrated in FIG. 4, the event pixel 20 includes, for example, a photoelectric conversion unit PD and an address event detection circuit 210. The photoelectric conversion unit PD includes, for example, a photodiode or the like, and causes a charge generated by photoelectrically converting incident light to flow out as a photocurrent $I_{photo}$. The flow-out photocurrent $I_{photo}$ flows into the address event detection circuit 210.

The address event detection circuit 210 includes a light reception circuit 212, a memory capacity 213, a comparator 214, a reset circuit 215, an inverter 216, and an output circuit 217.

The light reception circuit 212 includes, for example, a current-voltage conversion circuit, and converts the photocurrent $I_{photo}$ flowing out of the photoelectric conversion unit PD into a voltage $V_{pr}$. Here, the relationship of the voltage $V_{pr}$ with respect to the intensity (luminance) of light is usually a logarithmic relationship. That is, the light reception circuit 212 converts the photocurrent $I_{photo}$ corresponding to the intensity of light applied to the light receiving face of the photoelectric conversion unit PD into the voltage $V_{pf}$ that is a logarithmic function. However, the relationship between the photocurrent $I_{photo}$ and the voltage $V_{pr}$ is not limited to the logarithmic relationship.

The voltage $V_{pr}$ according to the photocurrent $I_{photo}$ output from the light reception circuit 212 passes through the memory capacity 213 and then is an inversion (−) input which is the first input of the comparator 214 as the voltage $V_{diff}$. The comparator 214 is usually configured by a differential pair transistor. The comparator 214 uses the threshold value voltage $V_b$ provided from the system control circuit 105 as a non-inverting (+) input which is a second input, and detects a positive event and a negative event in a time division manner. Furthermore, after the detection of the positive event/negative event, the event pixel 20 is reset by the reset circuit 215.

The system control circuit 105 outputs the voltage $V_{on}$ at a stage of detecting a positive event, outputs the voltage $V_{off}$ at a stage of detecting a negative event, and outputs the voltage $V_{reset}$ at a stage of performing reset in a time division manner as the threshold value voltage $V_b$. The voltage $V_{reset}$ is set to a value between the voltage $V_{on}$ and the voltage $V_{off}$, preferably an intermediate value between the voltage $V_{on}$ and the voltage $V_{off}$. Here, the "intermediate value" means to include not only a value when the value is strictly an intermediate value but also a value when the value is substantially an intermediate value, and existence of various variations caused by design or manufacturing is allowed.

Furthermore, the system control circuit 105 outputs an ON selection signal at a stage of detecting a positive event, outputs an OFF selection signal at a stage of detecting a negative event, and outputs a global reset signal at a stage of performing reset with respect to the event pixel 20. The ON selection signal is given as a control signal for a selection switch $SW_{on}$ provided between the inverter 216 and the output circuit 217. The OFF selection signal is given as a control signal for a selection switch $SW_{off}$ provided between the comparator 214 and the output circuit 217.

At a stage of detecting a positive event, the comparator 214 compares the voltage $V_{on}$ with the voltage $V_{diff}$ and when the voltage $V_{diff}$ exceeds the voltage $V_{on}$, outputs, as a comparison result, positive event information On indicating that the change amount of the photocurrent $I_{photo}$ exceeds the upper limit threshold value. The positive event information On is inverted by the inverter 216 and then supplied to the output circuit 217 through the selection switch $SW_{on}$.

At a stage of detecting a negative event, the comparator 214 compares the voltage $V_{off}$ with the voltage $V_{diff}$ and when the voltage $V_{diff}$ is lower than the voltage $V_{off}$, outputs, as a comparison result, negative event information Off indicating that the change amount of the photocurrent $I_{photo}$ is lower than the lower limit threshold value. The negative event information Off is supplied to the output circuit 217 through the selection switch $SW_{off}$.

The reset circuit 215 includes a reset switch $SW_{RS}$, a 2-input OR circuit 2151, and a 2-input AND circuit 2152. The reset switch $SW_{RS}$ is connected between the inverting (−) input terminal and the output terminal of the comparator 214, and is turned on (closed) to selectively short-circuit between the inverting input terminal and the output terminal.

The OR circuit 2151 receives two inputs of the positive event information On via the selection switch $SW_{on}$ and the negative event information Off via the selection switch $SW_{off}$. The AND circuit 2152 receives the output signal of the OR circuit 2151 as one input, receives the global reset signal supplied from the system control circuit 105 as the other input, and turns on (closes) the reset switch $SW_{RS}$ when either the positive event information On or the negative event information Off is detected and the global reset signal is in the active state.

As described above, when the output signal of the AND circuit 2152 enters into the active state, the reset switch $SW_{RS}$ short-circuits between the inverting input terminal and the output terminal of the comparator 214, and performs global reset on the event pixel 20. As a result, the reset operation is performed only on the event pixel 20 in which the event has been detected.

The output circuit 217 includes a negative event output transistor $NM_1$, a positive event output transistor $NM_2$, and a current source transistor $NM_3$. The negative event output transistor $NM_1$ has a memory (not illustrated) for holding the negative event information Off at a gate portion thereof. This memory has the gate parasitic capacitance of the negative event output transistor $NM_1$.

As with the negative event output transistor $NM_1$, the positive event output transistor $NM_2$ has a memory (not illustrated) for holding the positive event information On at a gate portion thereof. This memory has the gate parasitic capacitance of the positive event output transistor $NM_2$.

At the reading stage, the negative event information Off held in the memory of the negative event output transistor $NM_1$ and the positive event information On held in the memory of the positive event output transistor $NM_2$ are transferred to a readout circuit 130 through an output line nRxOff and an output line nRxOn for each pixel row of the pixel array unit 101 when a row selection signal is supplied from the system control circuit 105 to the gate electrode of the current source transistor $NM_3$. The readout circuit 130 is, for example, a circuit provided in the event signal processing circuit 103 (see FIG. 3).

As described above, the event pixel 20 has an event detection function of detecting a positive event and detecting a negative event in a time division manner under the control of the system control circuit 105 using one comparator 214.

1.4 Data Transmission

The event data generated in each pixel is output to the outside via the output I/F 109 from the EVS device 100 having the above configuration. In a case where the event data of an amount of data exceeding the transmission band is generated, there is a problem that the event data that cannot be transmitted is required to be discarded, and the detection efficiency of the event is lowered.

Furthermore, a method of efficiently transmitting the event data so as not to exceed the transmission band may include a method of compressing the event data. Although various coding schemes can be used for the compression of the event data, there is a scene in which each coding scheme is not effective. Therefore, in a case where the event data generated in the scene that a coding scheme is not effective is coded, the amount of data may be larger than that before the compression.

FIG. 5 is a diagram for explaining a case where the amount of data increases due to coding. In FIG. 5, (a) and (b) illustrate the amount of data for one line (one row) output from the EVS device in a case where the event data is not coded, and (c) and (d) illustrate the amount of data for one line (one row) in a case where the event data is coded. In addition, (a) and (c) illustrate a case where the number of events detected in one line is small (one pixel), and (b) and (d) illustrate a case where the number of events detected in one line is large (all pixels).

As illustrated (a) and (b) of FIG. 5, in the case of no coding, the event data for one line has the same amount of data in both the case (a) where the number of events detected in one line is small and the case (b) where the number of events detected in one line is large. On the other hand, as illustrated in (c) and (d), in the case of coding, in the case (c) where the number of events detected in one line is small, the amount of data can be reduced from that in the case of non-coding (a), while in the case (d) where the number of events is large, the amount of data increases from that in the case of non-coding (b). As described above, in a scene where the used coding scheme is not effective, the amount of data might be increased by coding the event data.

In such a case, it is required to discard the event data that cannot be transmitted in order to avoid a failure of the sensor operation due to the fact that the coded compressed data cannot be transmitted, and there is a problem that the detection efficiency of the event is lowered.

Therefore, in the present embodiment, the amount of data of the event data is reduced by a plurality of methods, and the event data reduced to the amount of data not exceeding the transmission band with the methods is transmitted via the output I/F 109. As a result, it is possible to suppress the occurrence of event data that cannot be transmitted, and thus, it is possible to suppress a decrease in event detection efficiency.

1.5 Schematic Configuration Example of Event Signal Processing Circuit

Figure 6:
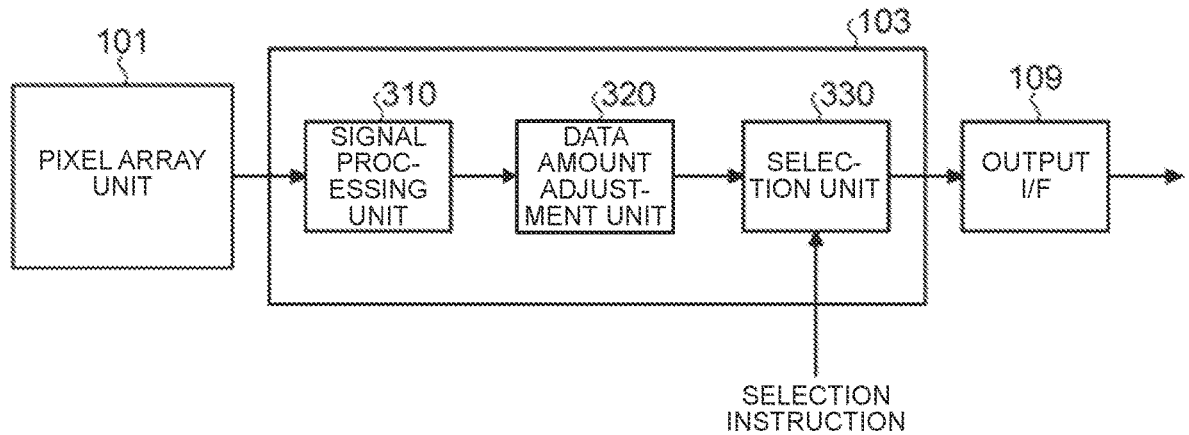
FIG. 6 is a block diagram illustrating a schematic configuration example of an event signal processing circuit according to the first embodiment.

For example, the event signal processing circuit 103 in the EVS device 100 reduces the amount of data of event data. FIG. 6 is a block diagram illustrating a schematic configuration example of an event signal processing circuit according to the present embodiment. As illustrated in FIG. 6, the event signal processing circuit 103 includes a signal processing unit 310, a data amount adjustment unit 320, and a selection unit 330.

(Signal Processing Unit 310)

The signal processing unit 310 generates event data (x, y, p, t) including the position information (x address, y address) of the pixel in which the event is detected, the polarity (p) of the detected event, and the time stamp (t) indicating the time when the event is detected based on the event signal output from the pixel array unit 101, for example, row by row. Note that the X arbiter 104A in the EVS device 100 permits the output of the event signal on a pixel row basis. In this case, an event signal is output to the event signal processing circuit 103 from the event pixels of one or more pixel columns permitted to be output by the Y arbiter 104B among the event pixels to which the pixel row permitted to be output belongs.

(Data Amount Adjustment Unit 320)

The data amount adjustment unit 320 reduces the amount of data of the event data output, for example, row by row from the signal processing unit 310 by using each of a plurality of methods. Here, FIG. 7 illustrates an example of the data amount adjustment unit 320 according to the present embodiment.

Figure 7:
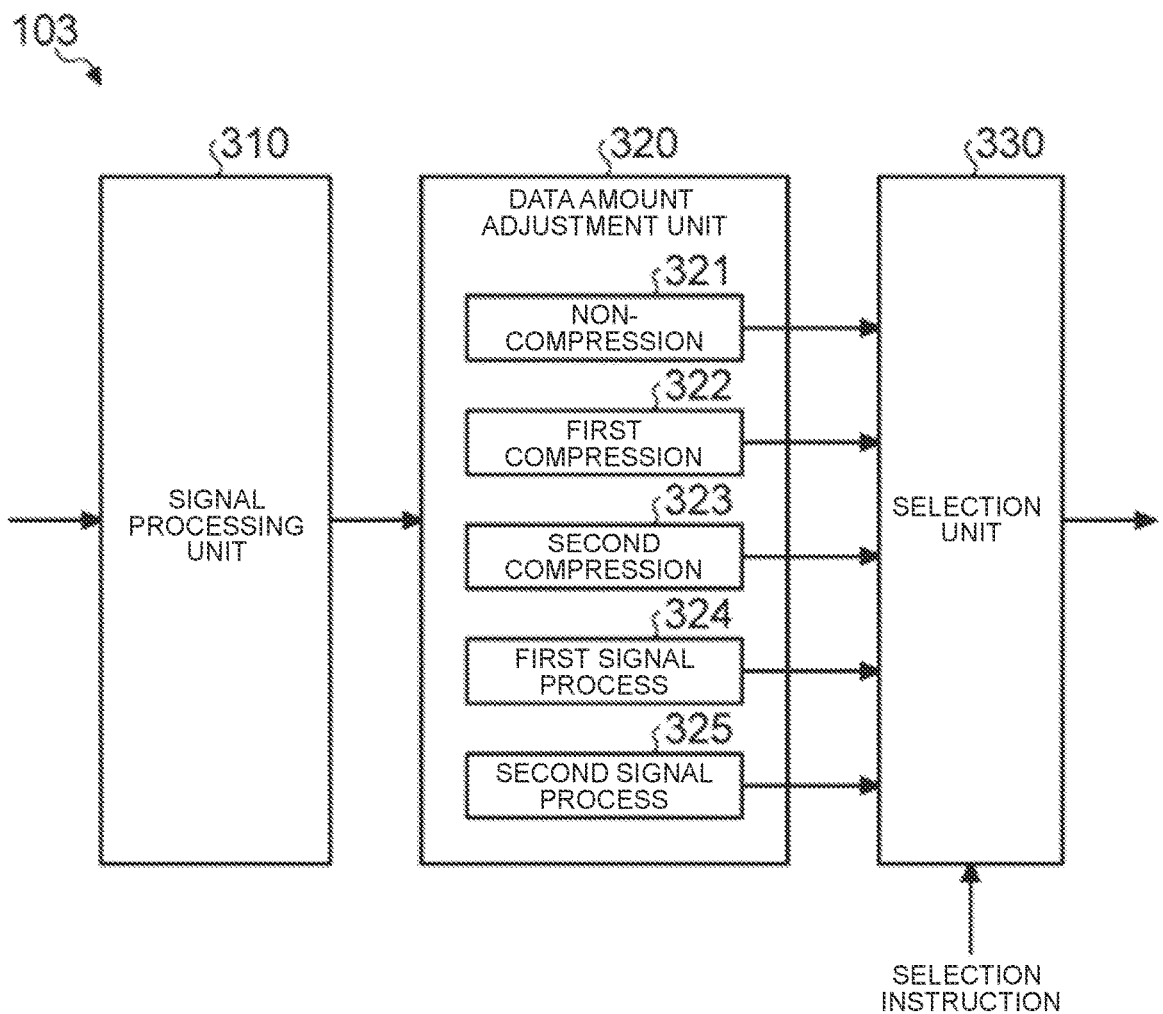
FIG. 7 is a block diagram illustrating an example of a data amount adjustment unit according to the first embodiment.

As illustrated in FIG. 7, the data amount adjustment unit 320 includes, for example, a non-compression unit 321, a first compression unit 322, a second compression unit 323, a first signal processing unit 324, and a second signal processing unit 325. That is, the data amount adjustment unit 320 according to the present example is configured to output a total of five types of event data including the original event data (hereinafter, also referred to as uncompressed data) and four types of event data whose amount of data has been adjusted by the compression and/or signal process. Note that the number of the types of event data output by the data amount adjustment unit 320 is not limited to five types, and may be two or more types.

The non-compression unit 321 includes, for example, a buffer or the like, and outputs the input event data (hereinafter, it is also simply referred to as input data) as it is.

The first compression unit 322 is a compression unit that compresses the event data by a first coding scheme. The second compression unit 323 is a compression unit that compresses the event data by a second coding scheme different from the first coding scheme. The second coding scheme may include a coding scheme that is the same as the first coding scheme and has a parameter different from that of the first coding scheme. Furthermore, the coding scheme that can be used by the first compression unit 322 and the second compression unit 323 may be a reversible coding scheme capable of restoring the original event data, or may be an irreversible coding scheme incapable of restoring the original event data. An example of a coding scheme that can be used by the first compression unit 322 and the second compression unit 323 will be described later.

The first signal processing unit 324 is a signal processing unit that adjusts the amount of data of the event data by the first signal process. The second signal processing unit 325 is a signal processing unit that adjusts the amount of data of the event data by second signal process different from the first signal process. Note that the second signal process may include a signal process that is the same as the first signal process and has a parameter different from that of the first signal process. Furthermore, the signal process that can be used by the first signal processing unit 324 and the second signal processing unit 325 may be a reversible signal process capable of restoring the original event data, or may be an irreversible signal process incapable of restoring the original event data. An example of signal process that can be used by the first signal processing unit 324 and the second signal processing unit 325 will be described later.

(Selection Unit 330)

The selection unit 330 selects event data of an amount of data not exceeding the transmission band of the output I/F 109 from the two or more types of event data output from the data amount adjustment unit 320 to output the selected event data to the output I/F 109. For example, the selection unit 330 may output the event data with the smallest amount of data among the two or more types of event data output from the data amount adjustment unit 320 to the output I/F 109.

In addition, for example, in a case where the amount of data of the uncompressed event data exceeds the transmission band of the output I/F 109, the selection unit 330 may output, to the output I/F 109, the event data with the smaller amount of data among the event data output from the first compression unit 322 and the second compression unit 323. Furthermore, in a case where both of the event data output from the first compression unit 322 and the event data output from the second compression unit 323 have an amount of data exceeding the transmission band of the output I/F 109, the selection unit 330 may output the event data with the smaller amount of data among event data output from the first signal processing unit 324 and the second signal processing unit 325 to the output I/F 109.

Furthermore, the selection unit 330 may output event data via a path designated from the outside. For example, in a case where non-compression (or the non-compression unit 321) is selected from the outside, the selection unit 330 may output the event data via the non-compression unit 321, in a case where compression (one of the first compression unit 322 and the second compression unit 323) is selected from the outside, the selection unit may output the compressed event data via the compression unit of the selected coding scheme, or in a case where a signal process (one of the first signal processing unit 324 and the second signal processing unit 325) is selected from the outside, the selection unit may output data (for convenience of description, this signal process result is also referred to as event data) whose amount of data has been reduced by the selected signal process. Note that the designation from the outside may be input, for example, via the system control circuit 105 (see FIG. 3) or may be directly input.

In addition, the selection unit 330 may output two or more types of event data among the plurality of types of input event data to the output I/F. For example, the selection unit 330 may output uncompressed event data and compressed or signal-processed event data to the output I/F. In addition, the output of two or more types of event data may be designated from the outside.

1.6 Example of Event Data

Next, the event data input from the signal processing unit 310 to the data amount adjustment unit 320 will be described with some examples.

First Example

Figures 8, 9, 10, 11:
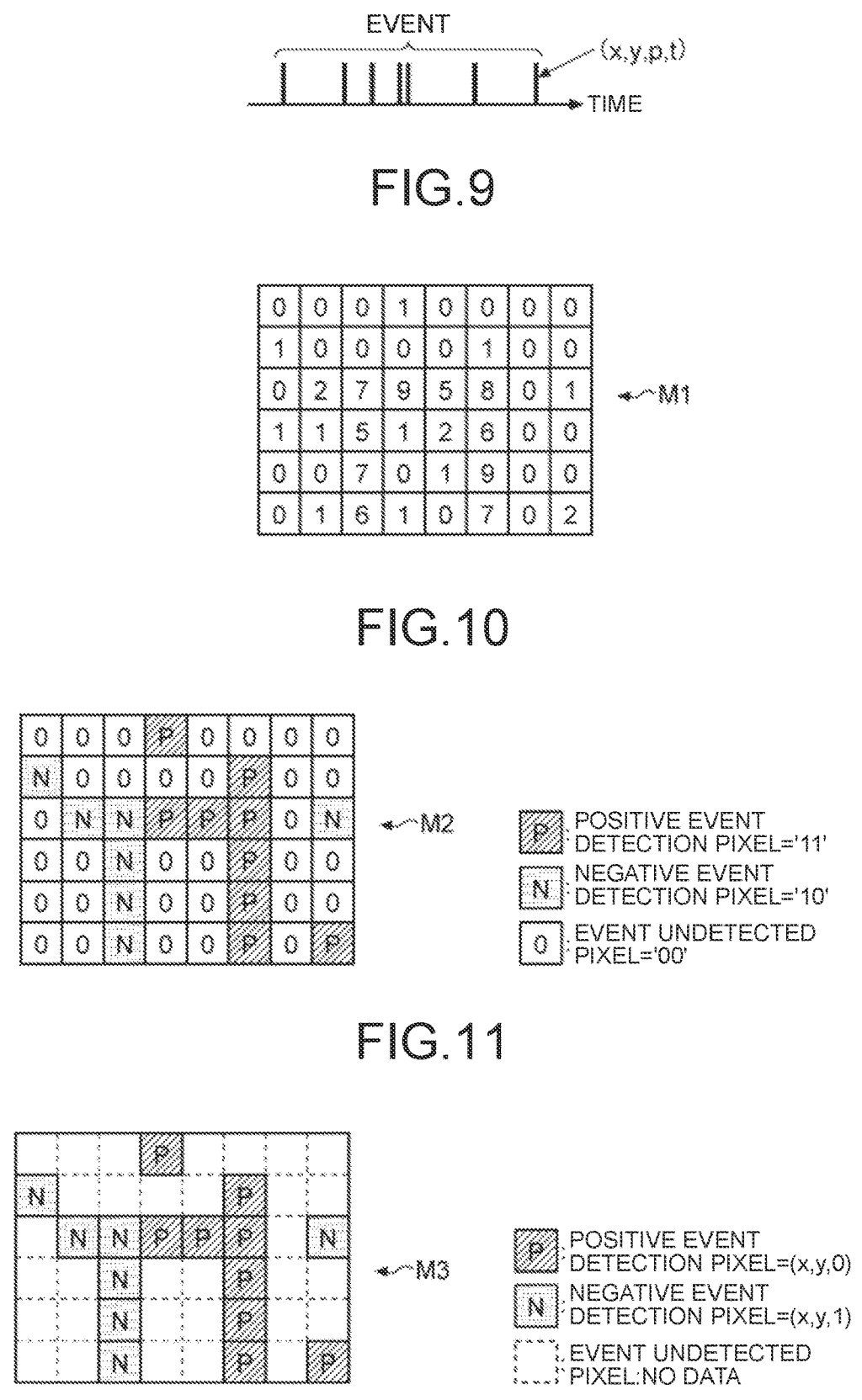

FIG. 8 is a diagram illustrating event data according to the first example of the present embodiment. As illustrated in FIG. 8, the event data generated by the signal processing unit 310 may be event data (x, y, p, t), for each pixel, including an x address and a y address (x, y) indicating the position on the pixel array unit 101 of the event pixel 20 in which the event has been detected, polarity information (p) indicating the polarity (positive event or negative event) of the detected event, and a time stamp (t) indicating the time when the event has been detected. Furthermore, the event data for each pixel may be input from the signal processing unit 310 to the data amount adjustment unit 320 in order according to the time series of the occurrence of the event.

Second Example

FIG. 9 is a diagram illustrating event data according to the second example of the present embodiment. As illustrated in FIG. 9, the signal processing unit 310 may generate a count map M1 in which the number of events detected in each pixel within one frame period is mapped according to an array of event pixels 20. Note that, in the generation of the count map M1, the positive event and the negative event may be counted separately, or the positive event and the negative event may be counted without being distinguished.

Third Example

FIG. 10 is a diagram illustrating event data according to the third example of the present embodiment. As illustrated in FIG. 10, the signal processing unit 310 may generate image data (hereinafter, also referred to as frame data) M2 indicating, with 2 bits, which of the positive event and the negative event has been detected in each pixel based on the event signal output from each pixel within one frame period. At this time, for a pixel in which both a positive event and a negative event have been detected within the same frame period, the pixel value of the corresponding pixel may be determined based on the polarity of the last detected event.

Fourth Example

FIG. 11 is a diagram illustrating event data according to the fourth example of the present embodiment. As illustrated in FIG. 11, the signal processing unit 310 may generate frame data M3 including the address (x, y) of the event pixel 20 that has detected an event within one frame period and the polarity (p) of the detected event. In this case, since there is a limitation of within one frame period, the time stamp (t) may not be included in the pixel value of each pixel.

1.7 Example of Coding Scheme

Next, a coding scheme applicable to the first compression unit 322 and the second compression unit 323 described above will be described with some examples. Note that, in the following, Hcomp coding, Run Length coding, Huffman coding, Light Huffman coding, Event Distance coding, and Entropy coding will be exemplified, but the present invention is not limited thereto. For example, various coding schemes may be used, such as a coding scheme according to the IEEE International Solid-State Circuits Conference (ISSCC) 2017 4.1 and a coding scheme according to the ISSCC 2020 5.10. Furthermore, in the following description, a case will be exemplified where one line includes 16 pixels, a positive event is detected in the head pixel (left end pixel) in the one line, negative events are detected in the twelfth to fourteenth pixels from the head, and no event is detected in the other pixels. However, the input data to be coded (compressed) is not limited to event data for one line, and may be variously modified, such as frame data.

1.7.1 First Coding Scheme

Figure 12:
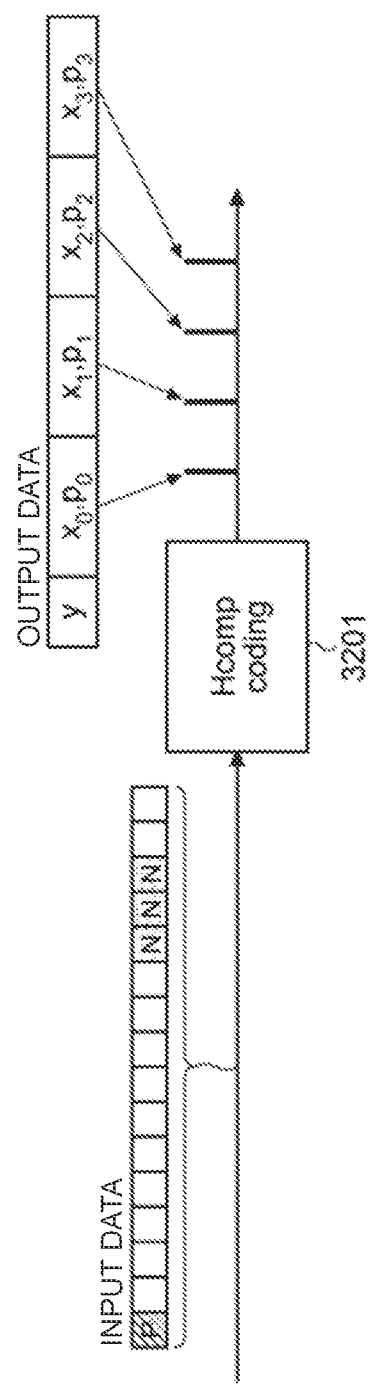
FIG. 12 is a diagram for explaining coding of event data for one line using a first coding scheme (Hcomp coding) according to the first embodiment (part 1).
Figure 13:
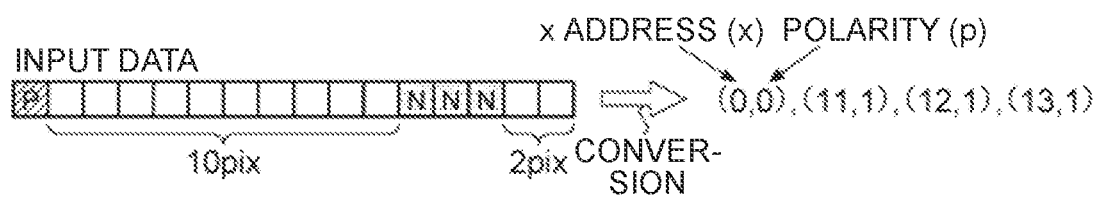
FIG. 13 is a diagram for explaining coding of event data for one line using the first coding scheme (Hcomp coding) according to the first embodiment (part 2).
Figure 14:
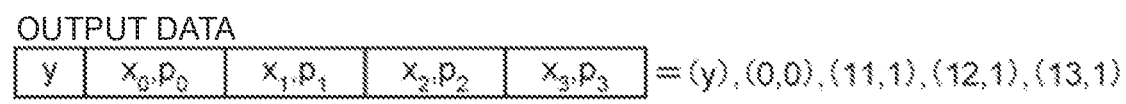
FIG. 14 is a diagram for describing coding of event data for one line using the first coding scheme (Hcomp coding) according to the first embodiment (part 3).

As a first coding scheme, Hcomp coding for converting event data into a data string expressed by the address of the pixel where the event has occurred and the polarity of the event is exemplified. FIGS. 12 to 14 are diagrams for describing coding of event data for one line using the first coding scheme (Hcomp coding).

As illustrated in FIG. 12, when input data for one line is input to a compression unit 3201 employing Hcomp coding, compressed data (hereinafter, referred to as output data) storing a y address 'y' indicating the corresponding line at the head, and thereafter, storing a set $(x_i, p_i)$ of an x address '$x_i$' (i is an integer of 0 or more) of the pixel in which the event is detected and the polarity '$p_i$' of the detected event is output from the compression unit 3201.

When this is applied to a specific example, the values following the head y address 'y' are, as illustrated in FIG. 13, the value $(x_0, p_0)=(0, 0)$ of the head pixel in which the positive event is detected, the value $(x_1, p_1)=(11, 1)$ of the twelfth pixel in which the negative event is detected, the value $(x_2, p_2)=(12, 1)$ of the thirteenth pixel in which the negative event is also detected, and the value $(x_3, p_3)=(13, 1)$ of the fourteenth pixel in which the negative event is also detected. Note that the polarity p=0 indicates a positive event, and p=1 indicates a negative event.

Therefore, as illustrated in FIG. 14, the output data $((y), (x_0, p_0), (x_1, p_1), (x_2, p_2), (x_3, p_3))$ output from the compression unit 3201 is a data string of $((y), (0, 0), (11, 1), (12, 1), (13, 1))$.

1.7.2 Second Coding Scheme

Figure 15:
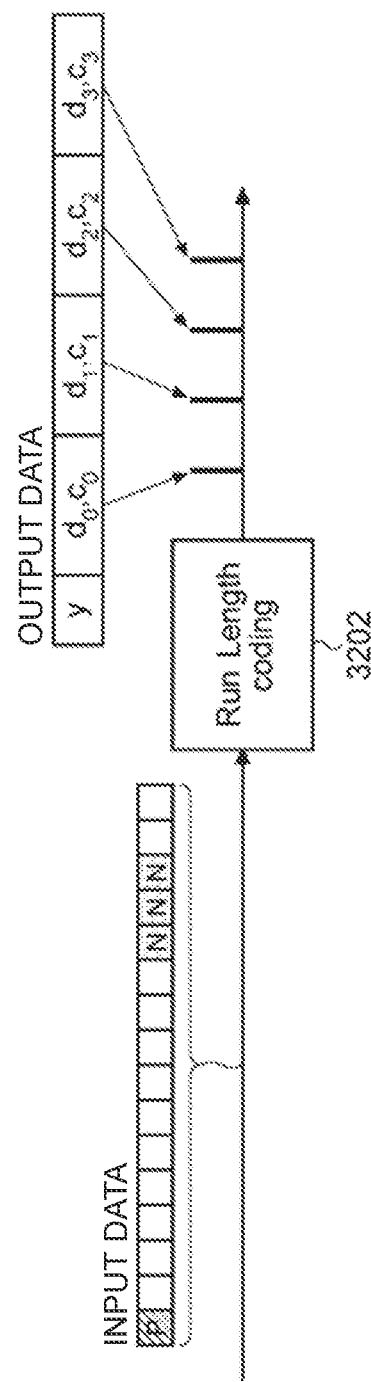
FIG. 15 is a diagram for describing coding of event data for one line using a second coding scheme (Run Length coding) according to the first embodiment (part 1).
Figures 16, 17:
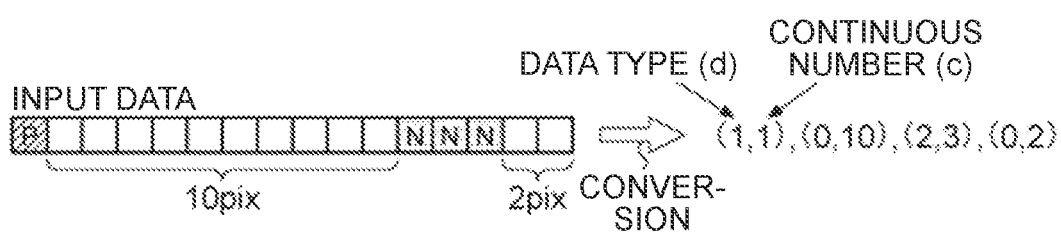
FIG. 16 is a diagram for describing coding of event data for one line using the second coding scheme (Run Length coding) according to the first embodiment (part 2).
FIG. 17 is a diagram for describing coding of event data for one line using the second coding scheme (Run Length coding) according to the first embodiment (part 3).

As the second coding scheme, Run Length coding for converting event data into a data string expressed by the type of data and the number of consecutive pieces of data is exemplified. FIGS. 15 to 17 are diagrams for describing coding of event data for one line using the second coding scheme (Run Length coding).

As shown in FIG. 15, when input data for one line is input to a compression unit 3202 employing Run Length coding, compressed data (output data) storing a y address 'y' indicating the corresponding line at the head, and thereafter, storing a set $(d_i, c_i)$ of a value '$d_i$' indicating the type of data (presence or absence of an event and polarity) and the number of consecutive values (consecutive number) '$c_i$' is output from the compression unit 3202.

When this is applied to a specific example, values following the head y address 'y' are, as illustrated in FIG. 16, a value $(d_0, c_0)=(1, 1)$ indicating that a positive event has been detected in the head pixel, a value $(d_1, c_1)=(0, 10)$ indicating that no event has been detected in the second to eleventh consecutive 10 pixels, a value $(d_2, c_2)=(2, 3)$ indicating that a negative event has been detected in the twelfth to fourteenth consecutive 3 pixels, and a value $(d_3, c_3)=(0, 2)$ indicating that no event has been detected in the fifteenth to sixteenth consecutive 2 pixels. Note that the data type d=0 indicates that no event has been detected, d=1 indicates a positive event, and d=2 indicates a negative event.

Therefore, as illustrated in FIG. 17, the output data $((y), (d_0, c_0), (d_1, c_1), (d_2, c_2), (d_3, c_3))$ output from the compression unit 3202 is a data string of $((y), (1, 1), (0, 11), (2, 3), (0, 2))$.

1.7.3 Third Coding Scheme

Figure 18:
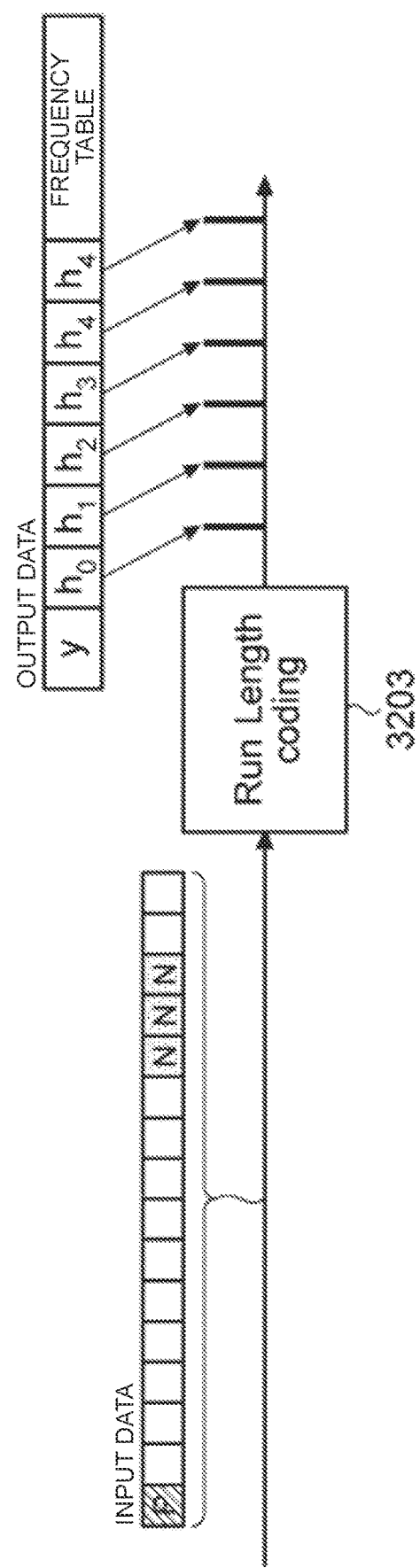
FIG. 18 is a diagram for describing coding of event data for one line using a third coding scheme (Huffman coding) according to the first embodiment (part 1).
Figure 19:
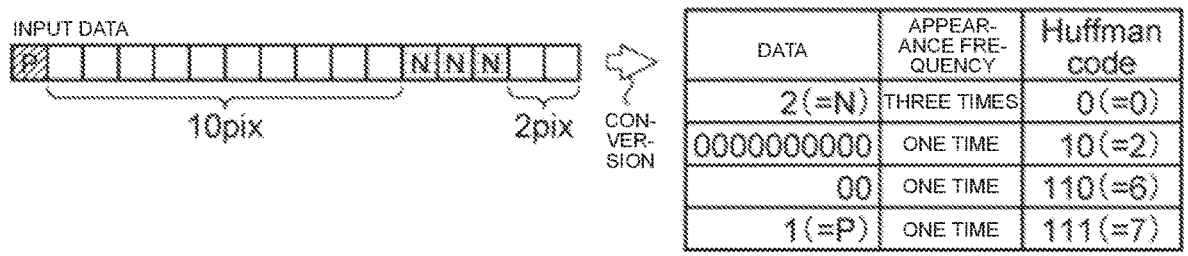
FIG. 19 is a diagram for describing coding of event data for one line using the third coding scheme (Huffman coding) according to the first embodiment (part 2).
Figure 20:
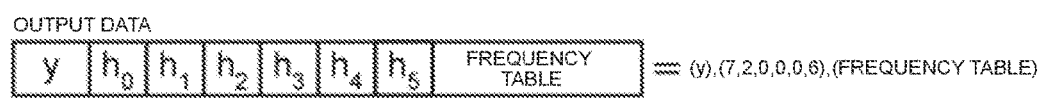
FIG. 20 is a diagram for describing coding of event data for one line using the third coding scheme (Huffman coding) according to the first embodiment (part 3).

As a third coding scheme, Huffman coding for converting event data into a data string of expression according to the appearance frequency of events is exemplified. FIGS. 18 to 20 are diagrams for describing coding of event data for one line using the third coding scheme (Huffman coding).

As illustrated in FIG. 18, when input data for one line is input to a compression unit 3203 employing Huffman coding, compressed data (output data) storing a y address 'y' indicating the corresponding line at the head, and thereafter, storing a Huffman code '$h_i$' associated with the bit string, and storing a frequency table in which the bit string is associated with the Huffman code at the end is output from the compression unit 3203.

When this is applied to a specific example, the input data (1, 0, 0, 0, 0, 0, 0, 0, 0, 0, 0, 2, 2, 2, 0, 0) can be divided into bit strings of '2' having three appearance frequencies, '0000000000' having one appearance frequency, '00' having one appearance frequency, and '1' having one appearance frequency. Note that '0' indicates no event, '1' indicates a positive event, and '2' indicates a negative event. Therefore, as illustrated in FIG. 19, for example, when the Huffman code '0' is assigned to the bit string '2', the Huffman code '10 (=2)' is assigned to the bit string '0000000000', the Huffman code '110 (=6)' is assigned to the bit string '00', and the Huffman code '111 (=7)' is assigned to the bit string '1' according to the rule of assigning the Huffman code of a small value to the bit string having a large number of appearances, the input data can be expressed as (7, 2, 0, 0, 0, 6).

Therefore, as illustrated in FIG. 20, the output data $((y), h_0, h_1, h_2, h_3, h_4)$ output from the compression unit 3203 is a data string of $((y), 7,2,0,0,0,6, (\text{frequency table}))$.

1.7.4 Fourth Coding Scheme

Figure 21:
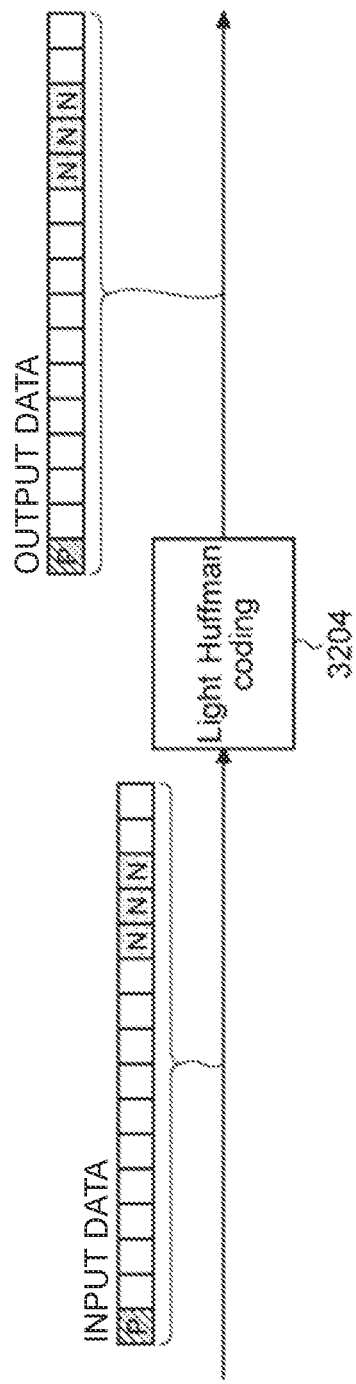
FIG. 21 is a diagram for describing coding of event data for one line using a fourth coding scheme (Light Huffman coding) according to the first embodiment (part 1).

As a fourth coding scheme, Light Huffman coding for converting event data into a data string in which absence of an event is represented by 1 bit and presence of an event is represented by 2 bits is exemplified. FIGS. 21 to 23 are diagrams for describing coding of event data for one line using a fourth coding scheme (Light Huffman coding).

As illustrated in FIG. 21, when input data for one line is input to a compression unit 3204 employing Light Huffman coding, output data in which absence of an event is represented by 1 bit and presence of an event is represented by 2 bits is output from the compression unit 3204.

Specifically, as illustrated in FIG. 22, assuming that a positive event is represented by 2 bits of '01', a negative event is represented by 2 bits of '10', and no event is represented by 2 bits of '00' in the input data, as illustrated in FIG. 23, the output data is converted into a bit string in which a positive event is represented by 2 bits of '11', a negative event is represented by 2 bits of '10', and no event is represented by 1 bit of '0'. However, the pixel to be converted into one bit is not limited to a pixel without an event, and may be, for example, a type of an event having the highest appearance frequency in one line (positive event, negative event, or no event).

1.7.5 Fifth Coding Scheme

Figure 24:
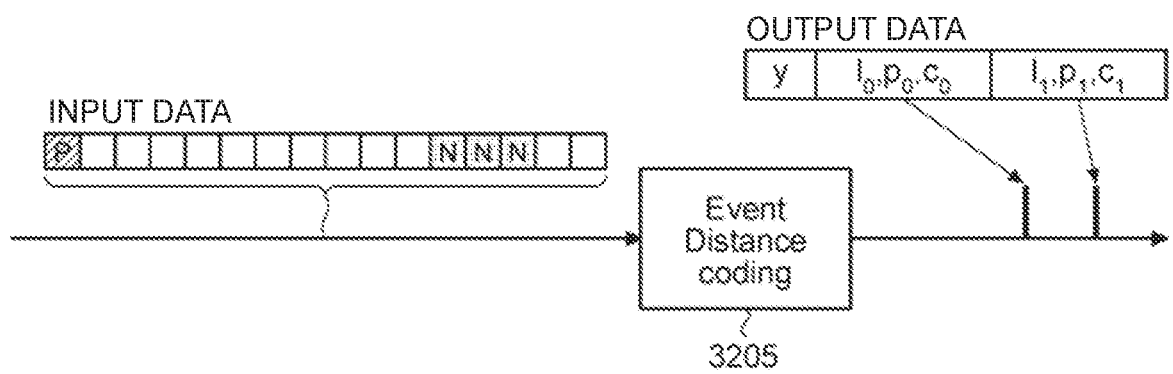
FIG. 24 is a diagram for explaining coding of event data for one line using a fifth coding scheme (Event Distance coding) according to the first embodiment (part 1).
Figure 25:
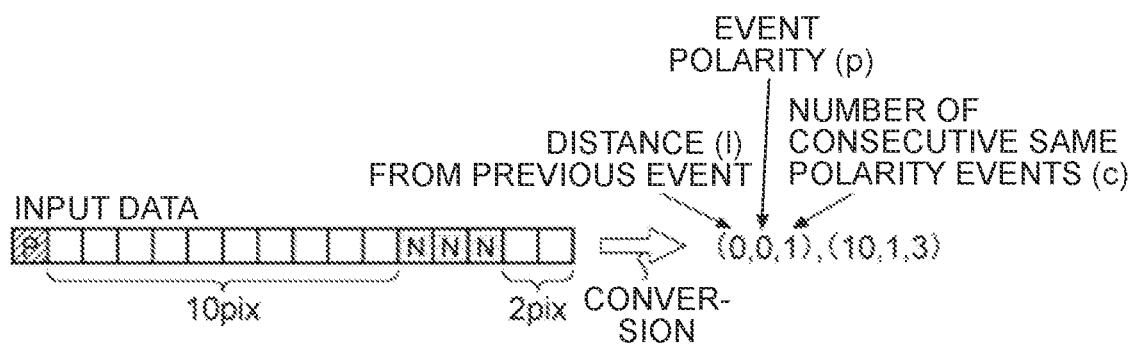
FIG. 25 is a diagram for explaining coding of event data for one line using the fifth coding scheme (Event Distance coding) according to the first embodiment (part 2).
Figure 26:
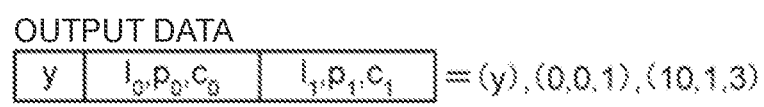
FIG. 26 is a diagram for describing coding of event data for one line using the fifth coding scheme (Event Distance coding) according to the first embodiment (part 3).

As a fifth coding scheme, Event Distance coding for converting event data into a data string expressed by a distance between events is exemplified. FIGS. 24 to 26 are diagrams for describing coding of event data for one line using a fifth coding scheme (Event Distance coding).

As illustrated in FIG. 24, when input data for one line is input to a compression unit 3205 employing Event Distance coding, compressed data (output data) storing a y address 'y' indicating the corresponding line at the head, and thereafter, storing a set $(l_i, p_i, c_i)$ of a distance (bit number) '$l_i$' from the previous event, a polarity '$p_i$' of the event, and the number of consecutive events '$c_i$' of the same polarity is output from the compression unit 3205.

When this is applied to a specific example, the values following the head y address 'y' are, as illustrated in FIG. 25, a value $(l_0, p_0, c_0)=(0, 0, 1)$ indicating that a positive event has been detected in one head pixel, and a value $(l1, p_1, c_1)=(10, 1, 3)$ indicating that a negative event has been detected in the twelfth to fourteenth consecutive three pixels 10 pixels apart from the head positive event pixel. Note that the polarity p=0 indicates a positive event, and p=1 indicates a negative event.

Therefore, as illustrated in FIG. 26, the output data ((y), $(l_0, p_0, c_0)$, $(l_1, p_1, c_1)$) output from the compression unit 3205 is a data string of ((y), (0, 0, 1), (10, 1, 3)).

1.7.6 Sixth Coding Scheme

Figure 27:
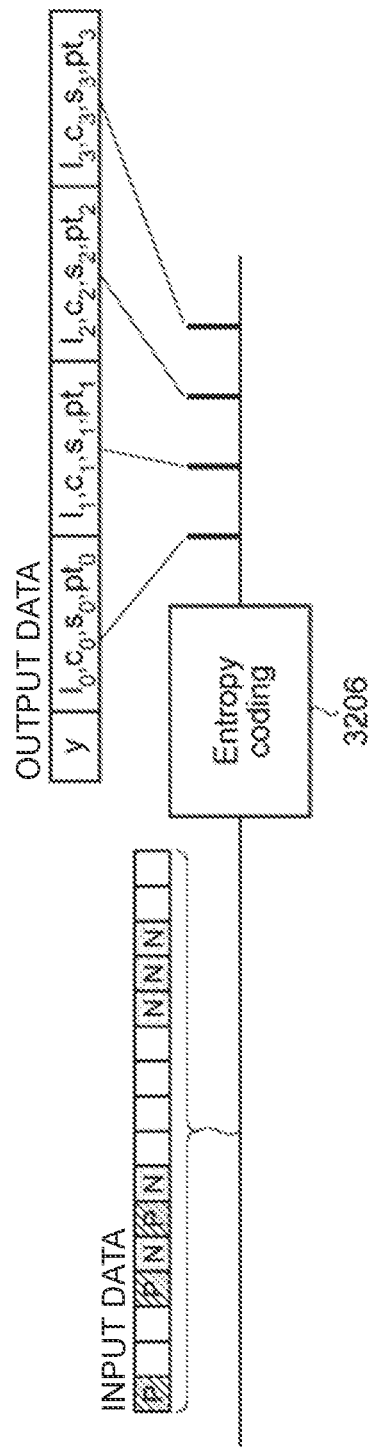
FIG. 27 is a diagram for describing coding of event data for one line using a sixth coding scheme (Entropy coding) according to the first embodiment (part 1).
Figures 28, 29:
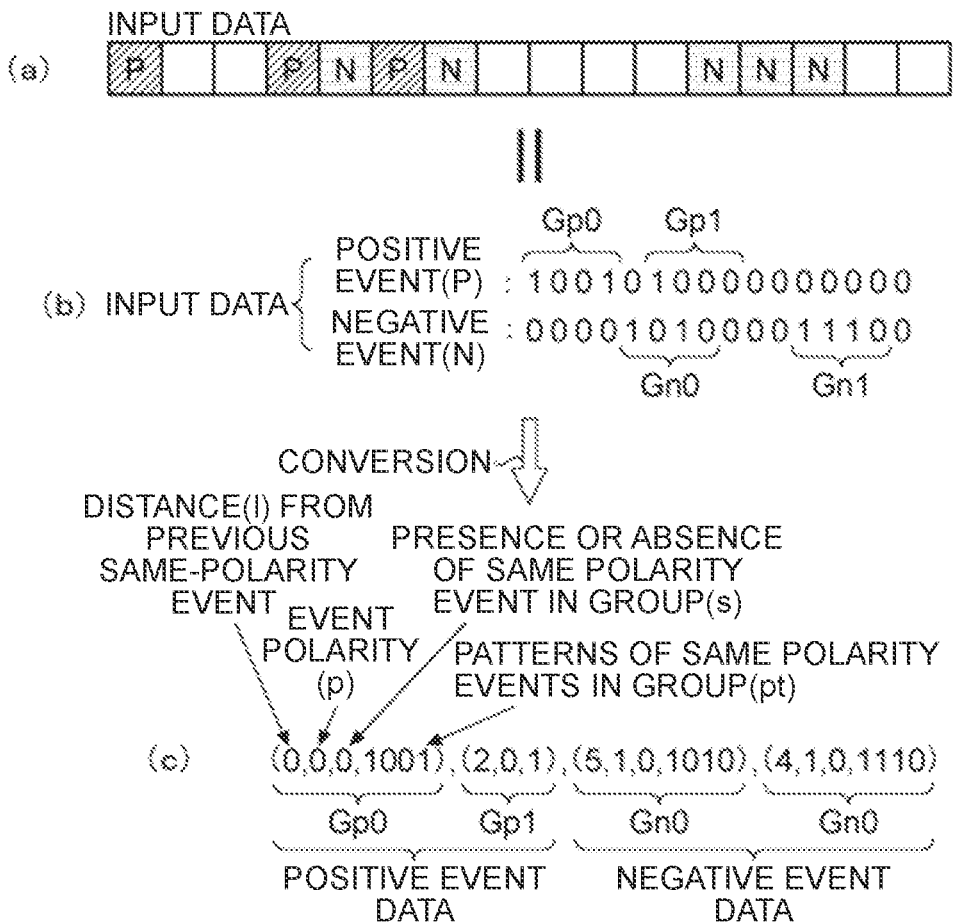
FIG. 28 is a diagram for describing coding of event data for one line using the sixth coding scheme (Entropy coding) according to the first embodiment (part 2).
FIG. 29 is a diagram for describing coding of event data for one line using the sixth coding scheme (Entropy coding) according to the first embodiment (part 3).

As a sixth coding scheme, Entropy coding for converting event data into a data string expressed by a distance between events and a data pattern is exemplified. FIGS. 27 to 29 are diagrams for describing coding of event data for one line using a sixth coding scheme (Entropy coding). Note that, in the present description, for understanding, a case where one line includes 16 pixels, a positive event is detected in the first, fourth, and sixth pixels from the head in one line, a negative event is detected in the fifth, seventh, twelfth to fourteenth pixels from the head, and no event is detected in the other pixels will be exemplified.

As illustrated in FIG. 27, when input data for one line is input to a compression unit 3206 employing Entropy coding, the compression unit 3206 groups a bit string of the input data according to a predetermined rule, and outputs compressed data (output data) storing a y address 'y' indicating the corresponding line at the head, and thereafter, storing a set $(l_i, p_i, s_i, pt_i)$ of a value '$l_i$' indicating a distance from the previous same polarity event, a polarity '$p_i$' of the event, a value '$s_i$' indicating presence or absence of the same polarity event in the group, and a value '$pt_i$' indicating an arrangement pattern of the same polarity events in the group based on this group.

When this is applied to a specific example, as illustrated in FIG. 28, the compression unit 3206 separates the input data illustrated in (a) into an event column of a positive event (P) and an event column of a negative event (N), as illustrated in (b). Note that, in the event column of the positive event (P) and the event column of the negative event (N) illustrated in (b), a pixel having an event is indicated by '1'.

Subsequently, the compression unit 3206 defines a group for each event column. In the definition of the group, a pixel in which the event is detected first from the head is set as a starting point, and pixels of a predetermined number of pixels from the pixel are set as one group. Therefore, in the event column of the positive event (P) illustrated in (b) of FIG. 28, in order from the left, a total of four pixels (that is, the first to fourth pixels) including the predetermined number of pixels (3 in this example) from the first pixel where the positive event first appears are defined as a group Gp0, and a total of four pixels (that is, the sixth to ninth pixels) including the predetermined number of pixels (=3) from the sixth pixel where the positive event first appears after the group Gp0 are defined as a group Gp1. Similarly, for the event column of the negative event (N), in order from the left, a total of four pixels (that is, the fifth to eighth pixels) of a predetermined number of pixels (3 in this example) starting from the fifth pixel where the negative event first appears are defined as a group Gn0, and a total of four pixels (that is, the twelfth to fifteenth pixels) of a predetermined number of pixels (=3) starting from the twelfth pixel where the negative event first appears after the group Gn0 are defined as a group Gn1.

As described above, when each of the event column of the positive events (P) and the event column of the negative event (N) is grouped, as illustrated in (c) of FIG. 28, the compression unit 3206 generates event data $(l_0, p_0, s_0, pt_0)=(0, 0, 0, 1001)$ of $l_0$='0', $p_0$='0', $s_0$='0', $pt_0$='1001' from the group Gp0 in the event column of the positive event (P). In addition, the compression unit 3206 generates event data $(l_i, p_1, s_1)=(2, 0, 1)$ of $l_1$='2', $p_1$='0', and $s_1$='1' from the group Gp1. Similarly, the compression unit 3206 generates event data $(l_2, p_2, s_2, pt_2)=(5, 1, 0, 1010)$ of $l_2$='5', $p_2$='1', $s_2$='0', $pt_2$='1010' from the group Gn0 in the event sequence of the negative event (N). In addition, the compression unit 3206 generates event data $(l_3, p_3, s_3, pt_3)=(4, 1, 0, 1110)$ of $l_i$='4', $p_i$='1', $s_i$='0', $pt_i$='1110' from the group Gn1.

Note that $p_i$='0' indicates a positive event, and $p_i$='1' indicates a negative event. Further, $s_i$='0' indicates that the same polarity event exists in the same group, and $s_i$='1' indicates that the same polarity event does not exist in the same group. Then, in a case where the same polarity event does not exist in the same group, the value '$pt_i$' indicating the arrangement pattern of the same polarity events in the group may be omitted as in the event data of the group Gp1.

Therefore, as illustrated in FIG. 29, the output data ((y), $(l_0, p_0, s_0, pt_0)$, $(l_1, p_1, s_1)$, $(l_2, p_2, s_2, pt_2)$, $(l_3, p_3, s_3, pt_3)$) output from the compression unit 3206 is a data string of ((y), (0, 0, 0, 1001), (2, 0, 1), (5, 1, 0, 1010), (4, 1, 0, 1110)).

1.8 Example of Signal Process

Next, the signal processes applicable to the first signal processing unit 324 and the second signal processing unit 325 described above will be described with some examples. Note that the signal process executed by each of the first signal processing unit 324 and the second signal processing unit 325 is also an example of a method for adjusting the amount of data of the event data. Furthermore, in the following, optical flow calculation, feature point extraction, and region of interest (ROI) extraction will be exemplified, but the present invention is not limited thereto. Various signal processes such as object recognition and noise reduction may be applied, and the signal process using machine learning such as a deep neural network (DNN), a convolution neural network (CNN), or a recurrent neural network (RNN) may be applied.

1.8.1 First Signal Process

Figure 30:
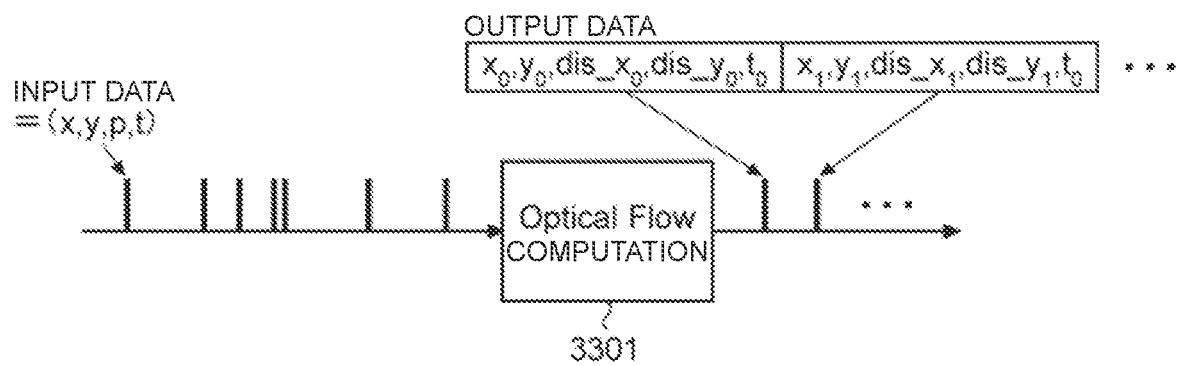
FIG. 30 is a diagram for explaining a first signal process (optical flow calculation) according to the first embodiment.

As the first signal process, a case where optical flow calculation is executed on frame data reconfigured from input event data will be exemplified. FIG. 30 is a diagram for explaining the first signal process (optical flow calculation).

The input data to a signal processing unit 3301 employing the optical flow calculation may be any of the event data exemplified above with reference to FIGS. 8 to 11 or other event data such as frame data. In the present description, a case where the event data according to the first example exemplified using FIG. 8 is input data will be exemplified.

As illustrated in FIG. 30, the signal processing unit 3301 reconstructs frame data from event data input during one frame period, and calculates an optical flow, for example, on a block by block basis from frame data of one or more previous frames reconstructed previously and frame data of a current frame reconstructed this time. The calculated optical flow may include, for example, a movement amount and a movement speed of each block. Note that the block may be one pixel or a region of M×N pixels (M and N are both integers of 1 or more).

In this way, when calculating the optical flow on a block by block basis, the signal processing unit 3301 generates output data ($x_i$, $y_i$, $dis\_x_i$, $dis\_y_i$) including an address ($x_i$, $y_i$) indicating the position of the block, $dis\_x_i$ indicating the optical flow of the block in the x direction, and $dis\_y_i$ indicating the optical flow of the block in the y direction for each block constituting the frame data. Note that the output data may include a time stamp '$t_j$' (j is an integer of 1 or more) as time information indicating the time of the current frame.

1.8.2 Second Signal Process

Figure 31:
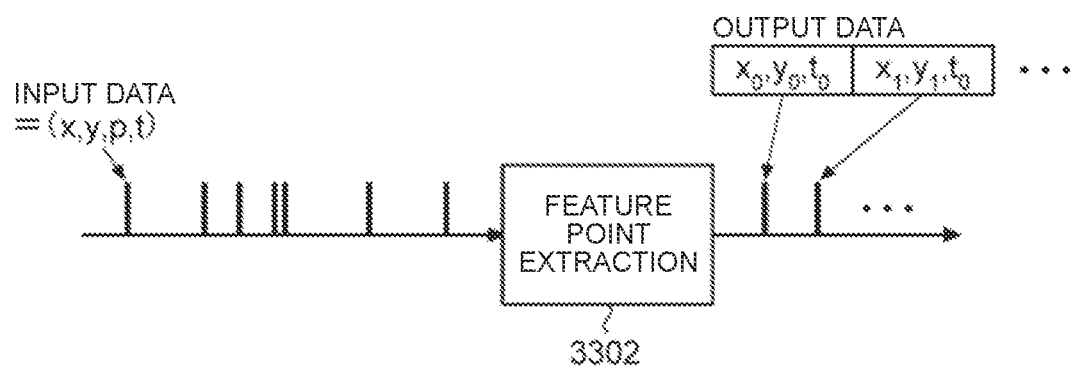
FIG. 31 is a diagram for explaining a second signal process (feature point extraction) according to the first embodiment.

As the second signal process, a case where feature point extraction is executed on frame data reconstructed from input event data will be exemplified. FIG. 31 is a diagram for describing the second signal process (feature point extraction).

As in the first signal process in which the optical flow calculation is used, the input data to a signal processing unit 3302 in which the feature point extraction is used may be any of the event data exemplified above with reference to FIGS. 8 to 11 or other event data such as frame data. In the present description, a case where the event data according to the first example exemplified using FIG. 8 is input data will be exemplified.

As illustrated in FIG. 31, the signal processing unit 3302 reconstructs frame data from event data input during one frame period, and executes a process of extracting a feature point on the reconstructed frame data. Then, the signal processing unit 3302 generates output data ($x_i$, $y_i$) including an address ($x_i$, $y_i$) indicating the position of the extracted feature point. Note that the output data may include a time stamp '$t_j$' as time information indicating the time of the current frame.

1.8.3 Third Signal Process

Figure 32:
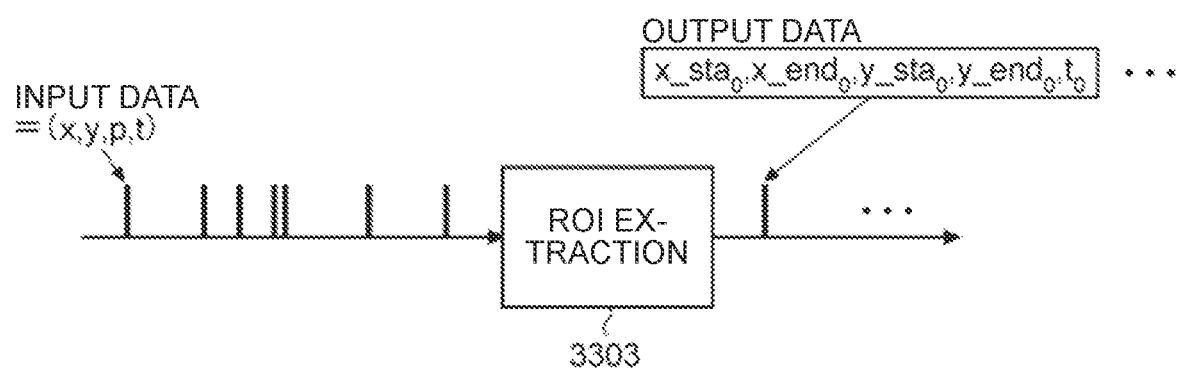
FIG. 32 is a diagram for explaining a third signal process (ROI extraction) according to the first embodiment.

As the third signal process, a case where ROI extraction is executed on frame data reconstructed from input event data will be exemplified. FIG. 32 is a diagram for describing the third signal process (ROI extraction).

As in the first and second signal processes described above, the input data to a signal processing unit 3303 in which the ROI extraction is used may be any of the event data exemplified above with reference to FIGS. 8 to 11 or other event data such as frame data. In the present description, a case where the event data according to the first example exemplified using FIG. 8 is input data will be exemplified.

As illustrated in FIG. 32, the signal processing unit 3303 reconstructs frame data from event data input during one frame period, and executes a process of extracting an ROI on the reconstructed frame data. Then, the signal processing unit 3302 generates output data ($x\_sta_i$, $x\_end_i$, $y\_sta_i$, $y\_end_i$) including an address ($x\_sta_i$,$y\_sta_i$) indicating the start point position and an address ($x\_end_i$,$y\_end_i$) indicating the end point position of the extracted ROI. Note that the output data may include a time stamp '$t_j$' as time information indicating the time of the current frame.

Figure 33:
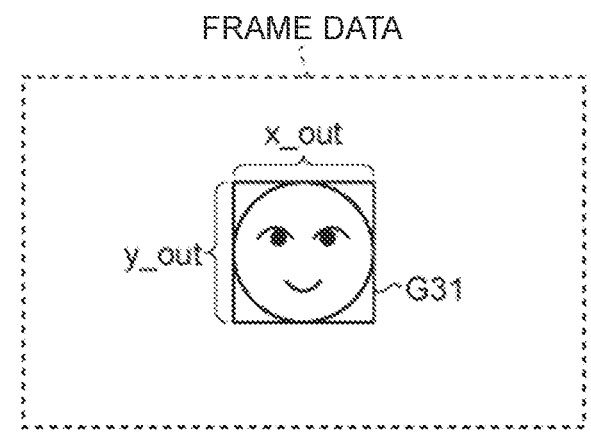
FIG. 33 is a diagram illustrating an example of image data cut out by the third signal process (ROI extraction) according to the first embodiment.

In addition to the output data indicating the position of the ROI calculated as described above, or instead of the output data indicating the position of the ROI, the signal processing unit 3303 may output image data G31 cut out as the ROI from the frame data as illustrated in FIG. 33.

1.9 Output Example of Frame Data

Next, an output mode of the frame data by the output I/F 109 will be described with some examples.

The output I/F 109 can use, for example, an interface standard such as a mobile industry processor interface (MIPI) camera serial interface (CSI)-2 (C-PHY, D-PHY, etc.), improved inter integrated circuits (I3C), or an acquisition law professional development program (ALPDP). When these interface standards are used, the output I/F 109 can output the event data after the adjustment of the amount of data to the outside in frame. Therefore, in the following, output of frame data in a case where the MIPI CSI-2 is used will be described with some examples.

1.9.1 First Output Example

Figure 34:
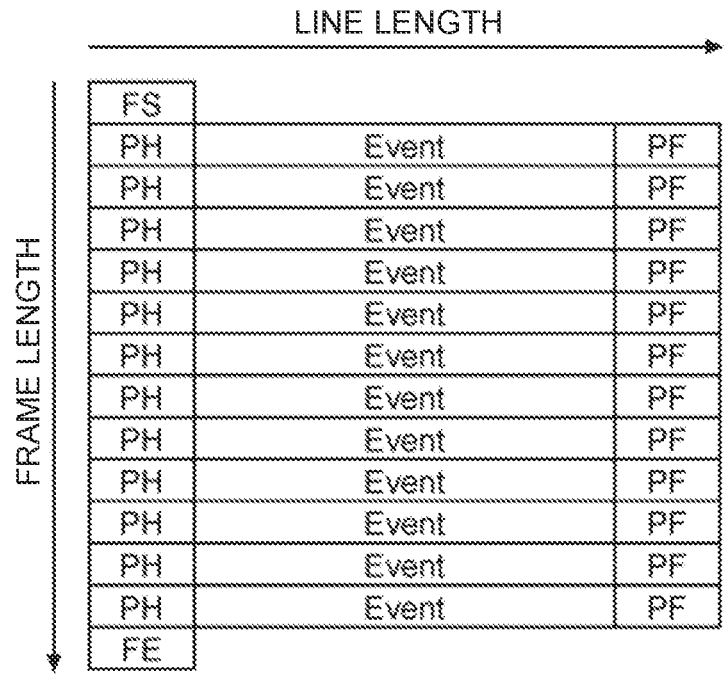
FIG. 34 is a schematic diagram illustrating an output mode of frame data according to a first output example of the first embodiment.

FIG. 34 is a schematic diagram illustrating an output mode of frame data according to the first output example. As illustrated in FIG. 34, in the first output example, in the configuration in which a frame header FS indicating the head of the frame data, a line header PH indicating the head of each line data, a line footer PF indicating the end of each line data, a line data Event sandwiched between the line header PH and the line footer PF, and a frame footer FE indicating the end of the frame data are output, the line data Event of all the lines constituting the frame data is included between the frame header FS and the frame footer FE.

In addition, each line data Event may include, in addition to the event data (for example, positive event, negative event, or no event) for all the pixels constituting each line, a y address indicating the position of the line, a flag indicating whether the line data is uncompressed data, which coding scheme is used for compressing the data, which signal process the processing result is based on, and the like.

As described above, in the present embodiment, the line data Event is coded compressed data. Therefore, an output form exemplified below can be used.

1.9.2 Second Output Example

Figure 35:
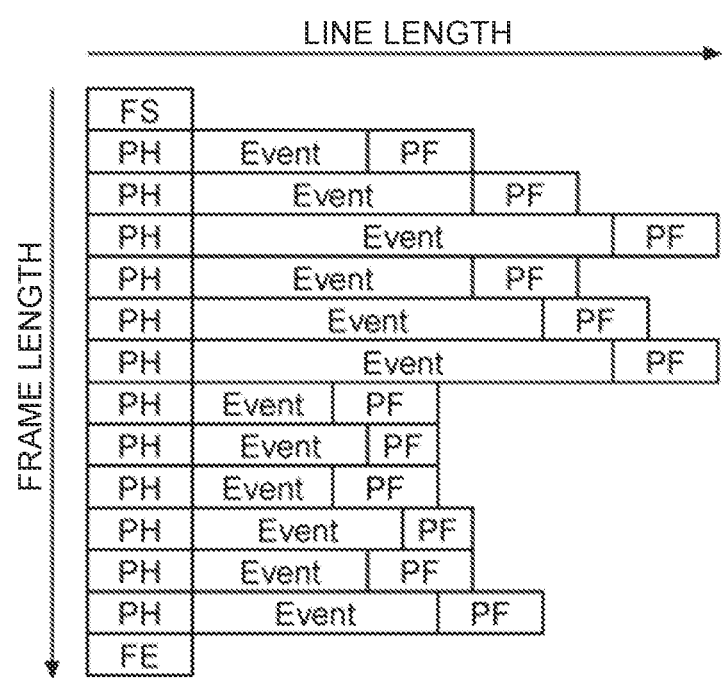
FIG. 35 is a schematic diagram illustrating an output mode of frame data according to a second output example of the first embodiment.

FIG. 35 is a schematic diagram illustrating an output mode of frame data according to the second output example. As illustrated in FIG. 35, in a mode similar to the output mode according to the first output example, in the second output example, the amount of data of the line data Event sandwiched between the line header PH and the line footer PF is reduced by the process by the data amount adjustment unit 320. As a result, the amount of data of one frame output from the output I/F 109 is reduced.

1.9.3 Third Output Example

Figure 36:
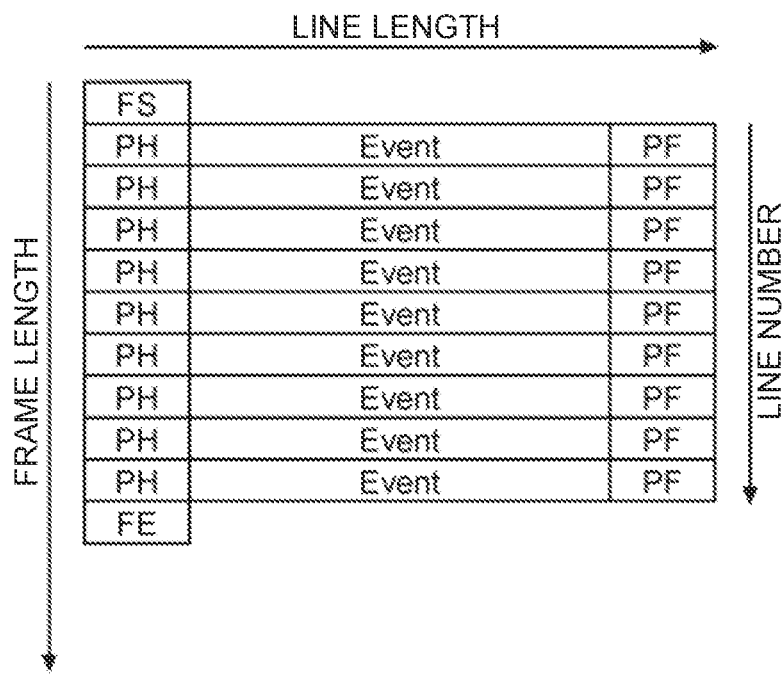
FIG. 36 is a schematic diagram illustrating an output mode of frame data according to a third output example of the first embodiment.

FIG. 36 is a schematic diagram illustrating an output mode of frame data according to the third output example. As illustrated in FIG. 36, in a mode similar to the output mode according to the first output example, in the third output example, the output of the line data Event is omitted for a line in which no event is detected. As a result, the amount of data of one frame output from the output I/F 109 is reduced.

1.9.4 Fourth Output Example

Figure 37:
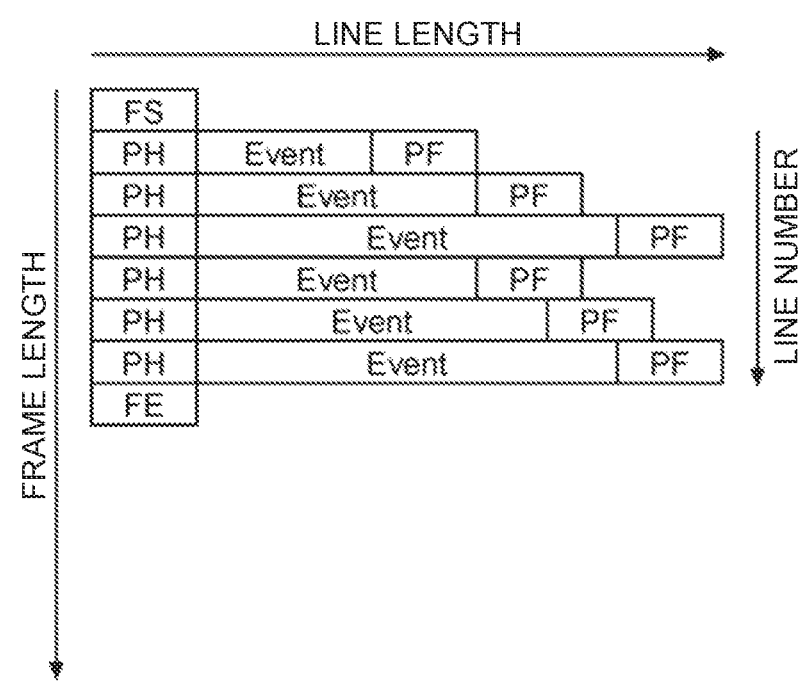
FIG. 37 is a schematic diagram illustrating an output mode of frame data according to a fourth output example of the first embodiment.

FIG. 37 is a schematic diagram illustrating an output mode of frame data according to the fourth output example. As illustrated in FIG. 37, in the fourth output example, by combining the second output example and the third output example described above, the amount of data of the line data Event sandwiched between the line header PH and the line footer PF is reduced, and the output of the line data Event is omitted for the line in which the event is not detected. As a result, the amount of data of one frame output from the output I/F 109 is further reduced.

1.9.5 Fifth Output Example

Figure 38:
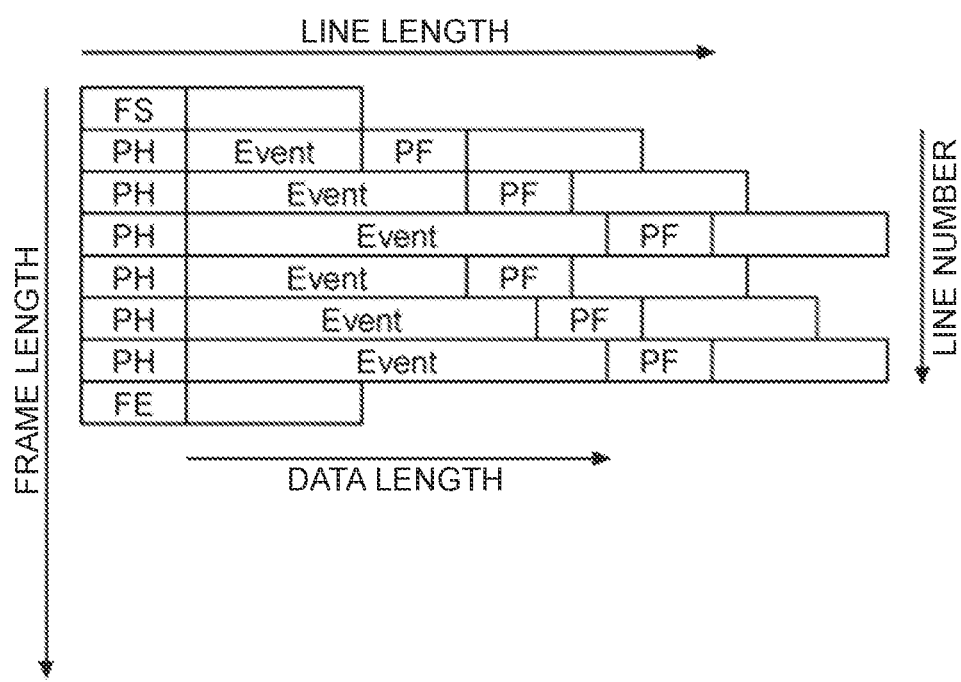
FIG. 38 is a schematic diagram illustrating an output mode of frame data according to a fifth output example of the first embodiment.

FIG. 38 is a schematic diagram illustrating an output mode of frame data according to the fifth output example. In the second output example and the fourth output example described above, since the amount of data of the line data Event sandwiched between the line header PH and the line footer PF is reduced, the transfer time of data for one line is shortened. Therefore, in the fifth output example, the output interval of the horizontal synchronization signal is made variable according to the amount of data transfer of each line. For example, for each line, the horizontal synchronization signal is output at the timing when the output of the line footer PF is completed. Accordingly, since the transfer time of each line can be shortened, the transfer time of one frame data can be shortened. Note that, in a case where the data transfer for the line in which the event is not detected is omitted, it goes without saying that the transfer time is further shortened accordingly.

1.10 Summary

As described above, the present embodiment has a configuration in which the amount of data of the event data to be output is adjusted by a plurality of methods (including non-compression), and compressed data with an amount of data not exceeding the transmission band can be selectively output among the acquired compressed data (including uncompressed data). As a result, it is possible to reduce the possibility of occurrence of event data that cannot be transmitted, and thus it is possible to suppress a decrease in event detection efficiency due to discarding of event data.

2. Second Embodiment

Next, the second embodiment will be described in detail with reference to the drawings. Note that, in the following description, the same configurations as those of the above-described embodiment are cited, and redundant description is omitted.

The electronic device and the solid-state imaging apparatus according to the present embodiment may be similar to the electronic device 1 and the solid-state imaging device (EVS device 100) described with reference to FIGS. 1 to 4 in the first embodiment. However, in the present embodiment, the event signal processing circuit 103 in the EVS device 100 is replaced with an event signal processing circuit 203 illustrated in FIG. 39.

2.1 Schematic Configuration Example of Event Signal Processing Circuit

Figure 39:
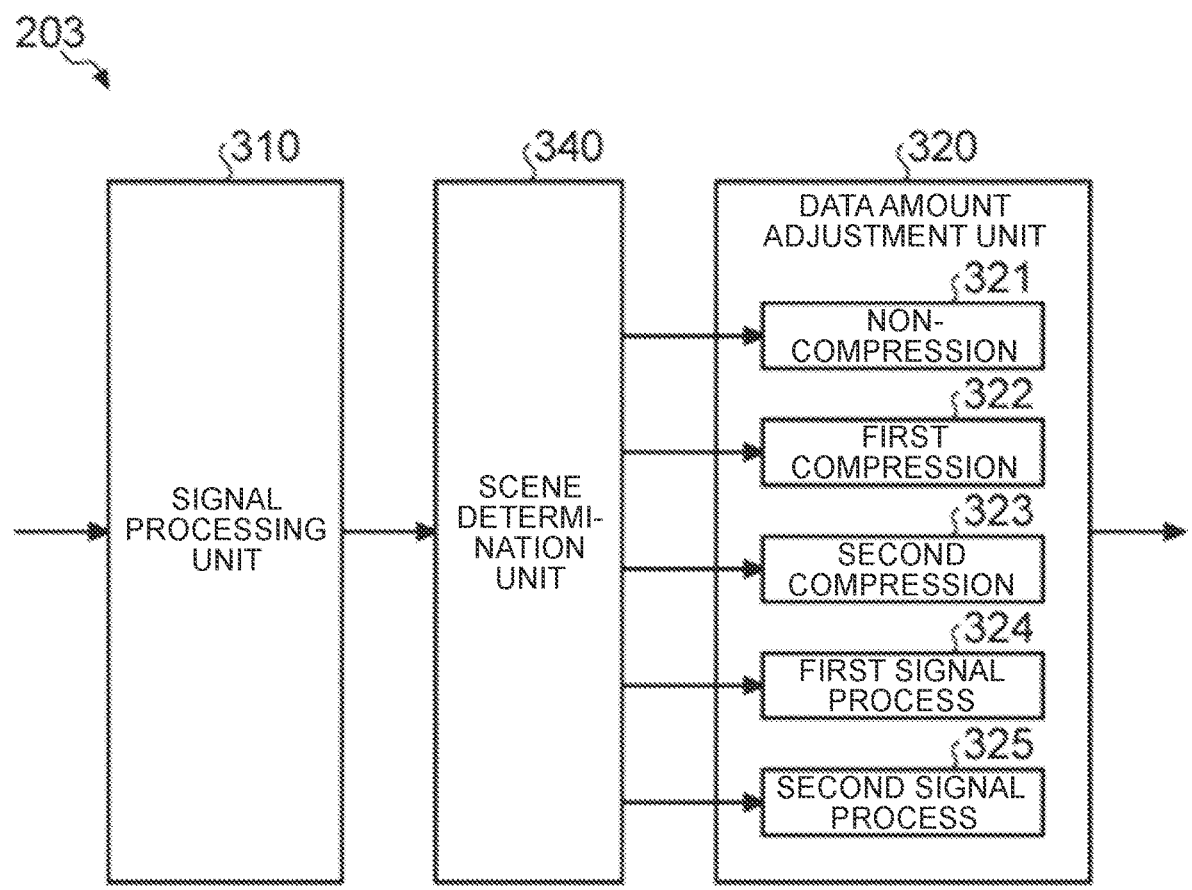
FIG. 39 is a block diagram illustrating a schematic configuration example of an event signal processing circuit according to a second embodiment.

FIG. 39 is a block diagram illustrating a schematic configuration example of an event signal processing circuit according to the present embodiment. As illustrated in FIG. 39, the event signal processing circuit 203 includes the signal processing unit 310, a scene determination unit 340, and the data amount adjustment unit 320. The signal processing unit 310 and the data amount adjustment unit 320 may be similar to, for example, those according to the first embodiment.

(Scene Determination Unit 340)

For example, the scene determination unit 340 determines the current scene based on the event data input from the signal processing unit 310, and selects a coding scheme (including non-compression) and/or a signal process (hereinafter, also referred to as a path) suitable for the current scene from the data amount adjustment unit 320 based on the determined scene. Then, the scene determination unit 340 inputs the event data input from the signal processing unit 310 to the one or more selected paths (any one or more of the non-compression unit 321, the first compression unit 322, the second compression unit 323, the first signal processing unit 324, and the second signal processing unit 325). As a result, compressed data (including uncompressed data) generated by coding or a signal process is output from the path to which the event data is input to the output I/F 109.

For example, an event number analysis algorithm, a firing rate analysis algorithm, a cluster analysis algorithm, scene determination using machine learning, or the like can be applied to the scene determination by the scene determination unit 340. In the event number analysis algorithm, for example, the current scene is determined from the number of pieces of event data detected within a predetermined period (for example, one frame period). In the firing rate analysis algorithm, for example, a current scene is determined by analyzing a firing rate of an event using a probability model. In the cluster analysis algorithm, for example, the current scene is determined by clustering the event data based on the address of the pixel where the event is detected, the polarity of the event, and the like, and analyzing the result. In the scene determination using machine learning, for example, the current scene is determined by inputting the input event data to the learned model and evaluating the result. However, the present invention is not limited to these methods, and various scene determination methods may be used.

2.2 Summary

As described above, in the present embodiment, before coding/performing a signal process on event data, a current scene is determined, and the event data is input to a suitable coding scheme (including non-compression) and/or signal process estimated from the determined scene. As a result, it is possible to stop the operation of the unused path (any one or more of the non-compression unit 321, the first compression unit 322, the second compression unit 323, the first signal processing unit 324, and the second signal processing unit 325), and thus, it is possible to suppress an increase in power consumption of the EVS device 100.

Note that other configurations, operations, and effects may be similar to those of the above-described embodiments, and thus a detailed description thereof will be omitted here.

2.3 Modification

Figure 40:
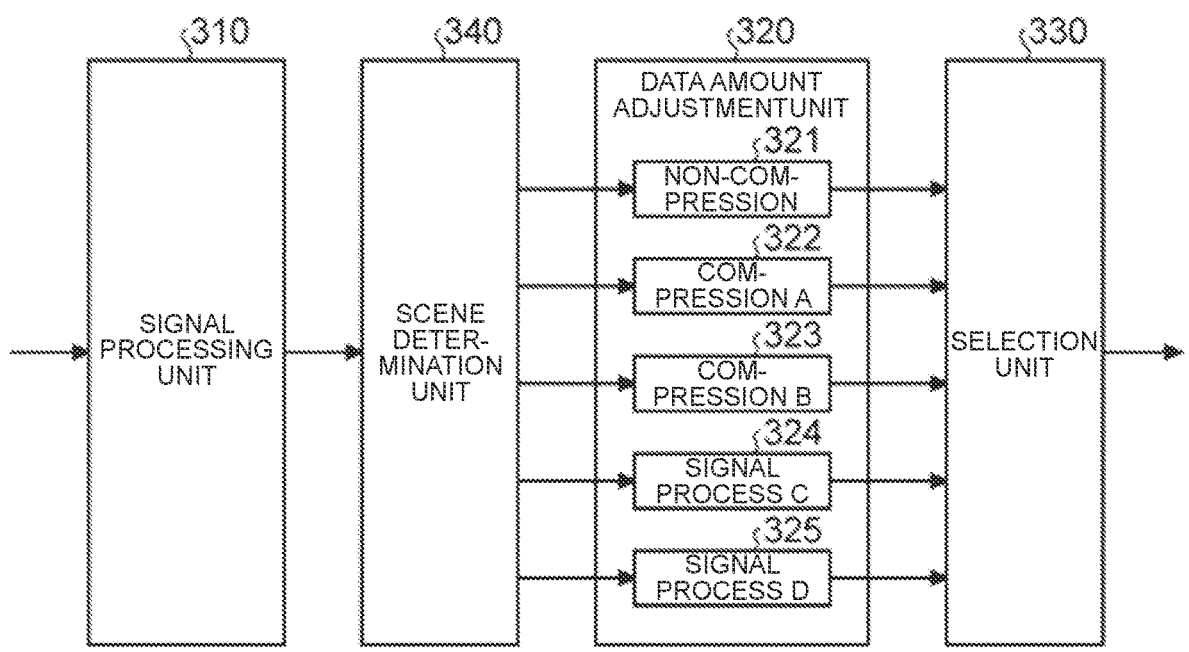
FIG. 40 is a block diagram illustrating a schematic configuration example of an event signal processing circuit according to a modification of the second embodiment.

Note that, as illustrated in FIG. 40, the configuration according to the first embodiment and the configuration according to the second embodiment described above can be combined. In this case, the selection unit 330 may output, to the output I/F 109, one or more pieces of compressed data (including uncompressed data) with an amount of data that does not exceed the transmission band among two or more pieces of compressed data (including uncompressed data) input via each of two or more paths selected by the scene determination unit 340.

3. Hardware Configuration

Figure 41:
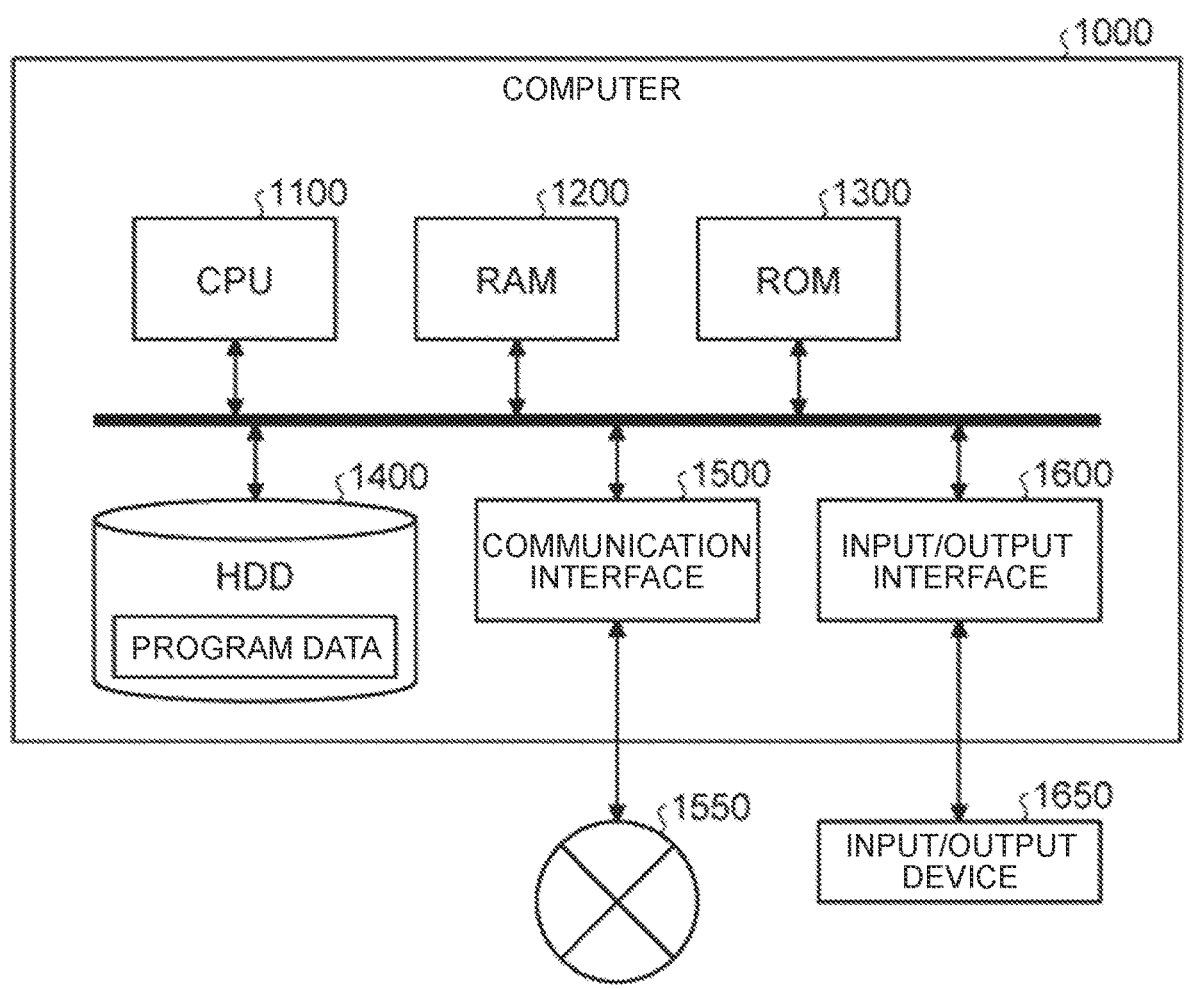
FIG. 41 is a hardware configuration diagram illustrating an example of a computer that implements functions of the information processing device according to the present disclosure.

The processing device 200/600 according to the embodiments, the modifications thereof, and the application examples described above can be realized by, for example, a computer 1000 having a configuration as illustrated in FIG. 41. FIG. 41 is a hardware configuration diagram illustrating an example of the computer 1000 that implements the functions of the processing device 200/600. The computer 1000 includes a CPU 1100, a RAM 1200, a read only memory (ROM) 1300, a hard disk drive (HDD) 1400, a communication interface 1500, and an input/output interface 1600. Respective units of the computer 1000 are connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records programs executed by the CPU 1100, data used by the programs, and the like. Specifically, the HDD 1400 is a recording medium that records a projection control program according to the present disclosure as an example of the program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 has a configuration including the I/F unit 18 described above, and is an interface that connects an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the processing device 200/600 according to the above-described embodiment, the CPU 1100 of the computer 1000 executes a program loaded on the RAM 1200 to implement at least one function of an event data processing unit 202, a RGB data processing unit 402, a ToF data processing unit 502, an object recognition processing unit 204, and a display information generation unit 205. In addition, the HDD 1400 stores a program and the like according to the present disclosure. The CPU 1100 reads the program data 1450 from the HDD 1400 and executes the program data, but as another example, the program may be acquired from another device via the external network 1550.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects in each embodiment described in the present specification are merely examples and are not limited, and other effects may be present.

The present technology may also be configured as below.

(1)

A solid-state imaging device including:
  a pixel array unit in which a plurality of pixels each detecting a change in luminance of incident light is disposed in a two-dimensional lattice pattern;
  a signal processing unit that generates first event data including position information about one or more pixels that detect a change in luminance;
  an adjustment unit that adjusts an amount of data of the first event data to generate second event data; and
  an output unit that outputs the second event data to an outside, wherein
  the adjustment unit includes a plurality of paths that adjusts the amount of data of the first event data by respective different methods to generate the second event data, and wherein the output unit outputs at least one of the second event data output from the plurality of respective paths to the outside.

(2)

The solid-state imaging device according to (1), wherein the plurality of paths includes one or more first paths that generate the second event data by each coding the first event data.

(3)

The solid-state imaging device according to (2), wherein the one or more first paths include a path that codes the first event data by using at least one of Hcomp coding, Run Length coding, Huffman coding, Light Huffman coding, Event Distance coding, and Entropy coding.

(4)

The solid-state imaging device according to any one of (1) to (3), wherein
  the plurality of paths includes one or more second paths that generate the second event data by each performing a signal process on the first event data.

(5)

The solid-state imaging device according to (4), wherein the one or more second paths include a path that performs a signal process on the first event data using at least one of optical flow calculation, feature point extraction, and region of interest (ROI) extraction.

(6)

The solid-state imaging device according to any one of (1) to (5), wherein
  the plurality of paths includes a third path that outputs the first event data as it is.

(7)

The solid-state imaging device according to any one of (1) to (6), wherein
the adjustment unit inputs the first event data input from the signal processing unit to the plurality of respective paths and inputs the second event data output from the plurality of respective paths to the output unit, and wherein
the output unit outputs one or more pieces of the second event data output from the plurality of respective paths to the outside.

(8)

The solid-state imaging device according to (7), wherein
the output unit outputs second event data with an amount of data not exceeding a transmission band among the second event data output from the plurality of respective paths to the outside.

(9)

The solid-state imaging device according to (7), wherein
the output unit outputs second event data with a smallest amount of data among the second event data output from the plurality of respective paths to the outside.

(10)

The solid-state imaging device according to any one of (1) to (6), further including:
a determination unit that determines a scene based on the first event data, wherein
the determination unit inputs the first event data to at least one path of the plurality of paths based on the scene determined based on the first event data.

(11)

The solid-state imaging device according to any one of (1) to (10), wherein
the output unit outputs the second event data to the outside in frame.

(12)

The solid-state imaging device according to (11), wherein
the output unit outputs frame data in which a data length of each line is adjusted by the adjustment unit to the outside.

(13)

The solid-state imaging device according to (11) or (12), wherein
the output unit outputs frame data not including line data of a line in which a pixel in which a change in luminance of incident light is detected does not exist to the outside.

(14)

The solid-state imaging device according to any one of (11) to (13), wherein
the output unit outputs a horizontal synchronization signal as soon as an output of the line data of each line is completed.

(15)

An electronic device including:
a solid-state imaging device according to any one of (1) to (14); and
an information processing device that processes second event data output from the solid-state imaging device.

REFERENCE SIGNS LIST

1 Electronic Device
20 Event Pixel
100 EVS Device (Solid-State Imaging Device)
101 Pixel Array Unit
103, 203 Event Signal Processing Circuit
104A X Arbiter
104B Y Arbiter
105 System Control Circuit
109 Output I/F
310 Signal Processing Unit
320 Data Amount Adjustment Unit
321 Non-Compression Unit
322 First Compression Unit
323 Second Compression Unit
324 First Signal Processing Unit
325 Second Signal Processing Unit
330 Selection Unit
340 Scene Determination Unit
3201 to 3205 Compression Unit
3301 to 3303 Signal Processing Unit
1010 Laser Light Source
1011 Light Source Drive Unit
1012 VCSEL
1021 Sensor Control Unit
1022 Light Reception Unit
1030 Irradiation Lens
1040 Imaging Lens
1060 System Control Unit
1070 Application Processor

The invention claimed is:

1. A solid-state imaging device including:
a pixel array unit in which a plurality of pixels each detecting a change in luminance of incident light is disposed in a two-dimensional lattice pattern;
a signal processing unit that generates first event data including position information about one or more pixels that detect a change in luminance;
an adjustment unit that adjusts an amount of data of the first event data to generate second event data; and
an output unit that outputs the second event data, wherein
the adjustment unit includes a plurality of paths that respectively adjust the amount of data of the first event data by respective different methods to generate instances of adjusted second event data, and wherein
the output unit outputs at least one of the instances of adjusted second event data output from the plurality of paths.

2. The solid-state imaging device according to claim 1, wherein the plurality of paths includes one or more first paths that generate one or more of the instances of adjusted second event data by respectively coding the first event data.

3. The solid-state imaging device according to claim 2, wherein the one or more first paths include a path that codes the first event data by using at least one of Hcomp coding, Run Length coding, Huffman coding, Light Huffman coding, Event Distance coding, and Entropy coding.

4. The solid-state imaging device according to claim 1, wherein the plurality of paths includes one or more second paths that generate one or more of the instances of second event data by respectively performing a signal process on the first event data.

5. The solid-state imaging device according to claim 4, wherein the one or more second paths include a path that performs a signal process on the first event data using at least one of optical flow calculation, feature point extraction, and region of interest (ROI) extraction.

6. The solid-state imaging device according to claim 1, wherein the plurality of paths includes a third path that outputs the first event data unadjusted.

7. The solid-state imaging device according to claim 1, wherein the adjustment unit inputs the first event data generated by the signal processing unit to the plurality of paths and inputs the instances of adjusted second event data to the output unit.

8. The solid-state imaging device according to claim 7, wherein the output unit outputs a given instance of adjusted second event data with an amount of data not exceeding a transmission band among the instances of adjusted second event data.

9. The solid-state imaging device according to claim 7, wherein the output unit outputs a given instance of adjusted second event data with a smallest amount of data among the instances of adjusted second event data.

10. The solid-state imaging device according to claim 1, further including:
a determination unit that determines a scene based on the first event data, wherein
the determination unit inputs the first event data to at least one path of the plurality of paths based on the scene determined based on the first event data.

11. The solid-state imaging device according to claim 1, wherein the output unit outputs the second event data in frame.

12. The solid-state imaging device according to claim 11, wherein the output unit outputs frame data in which a data length of each line is adjusted by the adjustment unit.

13. The solid-state imaging device according to claim 11, wherein the output unit outputs frame data not including line data of a line in which a pixel in which a change in luminance of incident light is detected does not exist.

14. The solid-state imaging device according to claim 11, wherein the output unit outputs a horizontal synchronization signal as soon as an output of line data of each line is completed.

15. An electronic device including:
a solid-state imaging device according to claim 1; and
an information processing device that processes second event data output from the solid-state imaging device.

* * * * *